US00RE40924E

(19) United States
(12) Reissued Patent
Nicholls et al.

(10) Patent Number: US RE40,924 E
(45) Date of Reissued Patent: Sep. 29, 2009

(54) LOGISTICS SYSTEM FOR AUTOMATING TRANSPORTATION OF GOODS

(75) Inventors: Peter Nicholls, Brussels (BE); Robert Kinyon, Tulsa, OK (US); Jeff Skaistis, Austin, TX (US); Steve Johnson, Tulsa, OK (US); Andy Locker, Tulsa, OK (US); Chris Guzik, Owasso, OK (US); Scott Howard, Tulsa, OK (US)

(73) Assignee: United Parcel Service of America, Inc., Atlanta, GA (US)

(21) Appl. No.: 09/315,680

(22) Filed: May 20, 1999

Related U.S. Patent Documents

Reissue of:
(64) Patent No.: 5,631,827
Issued: May 20, 1997
Appl. No.: 08/471,368
Filed: Jun. 6, 1995

U.S. Applications:
(62) Division of application No. 08/128,358, filed on Sep. 28, 1993, now Pat. No. 5,485,369.

(51) Int. Cl.
*G06Q 40/00* (2006.01)

(52) U.S. Cl. ..... 705/28; 705/1; 705/7; 705/400; 235/385

(58) Field of Classification Search ..... 705/1, 705/7, 28, 40, 404, 410; 707/10–44, 100–104
See application file for complete search history.

(56) References Cited

U.S. PATENT DOCUMENTS 4,511,958 A 4/1985 Funk
4,713,761 A * 12/1987 Sharpe et al.
4,799,156 A 1/1989 Shavit et al.
4,837,701 A * 6/1989 Samsone et al.

(Continued)

FOREIGN PATENT DOCUMENTS

EP 0 343 933 * 5/1989
EP 0484 875 A2 * 5/1992
EP 0 464 766 B1 11/1998

OTHER PUBLICATIONS

Canna, elizabeth, A supermarket for transport services, American shipper, v34, n5, p45, May 1992.*
Brown, Kevin, Survey of Distribution Services, financial Times, p22, May 12, 1986.*
Business America, Shipping your product to the overseas buyer, v5, n9, pp. 20–22, Mar. 5, 1982.*
Canna, Elizabeth, "A supermaket for transport services. . . ", American Shipper, v34, n5, p45(4), dialog file 148, accession No. 059119261, May 1992.*
Bonney, Joseph, "Air Canada joins CARAT . . . ", American Shipper, v34, n1, p50(1, Jan. 1992).*
Michael J. Feeley and Henry M. Levy, "Distributed Shared Memory with Versioned Objects," (Dept. of Computer Science and Engineering, FR–35, University of Washington, Seattle, WA 98195, 247–262 (1992).
"Advanced Communications Software Introduced For Newton; Ex Machina Debuts Pocketcall Terminal Program and Notify! Wireless Messaging to Newton" (Aug. 2, 1993).

(Continued)

*Primary Examiner*—Frantzy Poinvil
(74) *Attorney, Agent, or Firm*—Alston & Bird LLP

(57) ABSTRACT

The various transportation logistics tasks, such as order processing, order fulfillment, transportation of goods and tracking, are assigned to individual client/server objects which make up the building blocks of the computerized logistics management system. A tokenized message handling scheme allows client and server objects to share information, even where the respective data types do not match. An external processing manager provides script handling services to other client applications, allowing those applications to modify the performance of other program objects and to communicate with the outside world.

92 Claims, 18 Drawing Sheets

U.S. PATENT DOCUMENTS

| | | | | |
|---|---|---|---|---|
| 4,862,357 | A | | 8/1989 | Ahstrom et al. |
| 4,949,272 | A | | 8/1990 | Vanourek et al. |
| 5,008,827 | A | * | 4/1991 | Samsone et al. |
| 5,021,953 | A | | 6/1991 | Webber et al. |
| 5,038,283 | A | | 8/1991 | Caveney |
| 5,050,078 | A | | 9/1991 | Sansone |
| 5,068,797 | A | | 11/1991 | Sansone et al. |
| 5,072,401 | A | * | 12/1991 | Samsone et al. |
| 5,124,926 | A | | 6/1992 | Barns-Slavin et al. |
| 5,161,109 | A | | 11/1992 | Keating et al. |
| 5,220,501 | A | | 6/1993 | Lawlor et al. |
| 5,253,342 | A | | 10/1993 | Blount et al. |
| 5,262,939 | A | | 11/1993 | Vanpoucke |
| 5,293,310 | A | | 3/1994 | Carroll et al. |
| 5,325,527 | A | | 6/1994 | Cwikowski et al. |
| 5,337,246 | A | | 8/1994 | Carroll et al. |
| 5,363,121 | A | | 11/1994 | Freund |
| 5,493,491 | A | | 2/1996 | Calcerano et al. |
| 5,684,965 | A | | 11/1997 | Pickering |
| 5,694,551 | A | | 12/1997 | Doyle et al. |
| 5,778,348 | A | | 7/1998 | Manduley et al. |
| 5,802,293 | A | | 9/1998 | van der Sijpt |
| 5,832,511 | A | | 11/1998 | Beck et al. |
| 5,852,809 | A | | 12/1998 | Abel et al. |
| 5,971,592 | A | | 10/1999 | Kralj et al. |
| 6,006,199 | A | | 12/1999 | Berlin et al. |
| 6,115,713 | A | | 9/2000 | Pascucci et al. |
| 6,161,122 | A | | 12/2000 | Hawkes |
| 6,199,100 | B1 | | 3/2001 | Filepp et al. |
| 6,202,054 | B1 | | 3/2001 | Lawlor et al. |

OTHER PUBLICATIONS

"WINBEEP (TM) Remote Message Technology Integrated into Lanlord (R) 2.0" (Aug. 19, 1993).
"ACI Ships 4D Server" (Dec. 4, 1992).
"New Micro Focus Product Offerings Promote Open Client/Server Framework" (Apr. 19, 1993).
"Suite Talk Now Shipping on IBM's OS/2" (Dec. 15, 1992).
"Paperclip 2.0 Offers High–End Image Management Solution For PC/Lans" (Sep. 15, 1992).
"Imagery Delivers on Promise of Desktop Imaging" (Sep. 14, 1992).
"RMS Announces EDI Breakthrough" (Jun. 1992).
"Primavera 5.0 Sets New Standard For Project Management—Targets Corporate Market" (Jun. 15, 1992).

* cited by examiner

LOGISTICS SYSTEM FOR AUTOMATING TRANSPORTATION OF GOODS

Matter enclosed in heavy brackets [ ] appears in the original patent but forms no part of this reissue specification; matter printed in italics indicates the additions made by reissue.

This is a division of U.S. patent application Ser. No. 08/128,358 entitled "Logistics System for Automating Transportation of Goods", filed Sep. 28, 1993, now U.S. Pat. No. 5,485,369.

BACKGROUND OF THE INVENTION

The present invention relates generally to computerized systems for expediting the shipping of goods in commerce. More particularly, the invention relates to a computerized logistics system for managing and integrating various aspects of order processing, order fulfillment and goods transportation and tracking.

In the past, computerized systems for expediting the shipping of goods have fallen into two rather diverse categories. At the low cost end of the spectrum have been the standalone postage meters and mail manifest systems used by small businesses to automate the package weighing and carrier manifest printing functions. At the other end of the spectrum are the mainframe computer-based systems employed by large nationwide mail order merchandisers. At both ends of the spectrum the systems have had a number of limitations.

The standalone mail manifesting systems are limited in that they are designed to automate only the shipping functions such as printing mailing label and mailing manifest by the shipping clerk or shipping department. As such, the conventional standalone system was not integrated with the customer order department or with the order fulfillment and order packaging departments. Hence, conventional standalone systems have lacked the ability to take order size, package size or time in transit into account when selecting the least cost carrier.

Large mainframe order processing systems are also limited. Due to the complexity of mainframe computer architecture and associated software systems, it is not practical to use these solutions in the small or moderate sized business environment. Mainframe-based systems often require years to develop and to customize for a particular organization's needs. Thereafter, large data processing departments are needed to maintain the system and keep it operational.

The present invention provides a high-performance, cost-effective logistics system which is readily adaptable to a wide variety of different organizations. The system is suitable for deployment on a single, standalone computer or on a computerized network comprising many computers. Among the advantages of the present system are (1) substantial reduction in freight costs; (2) a major increase in fulfillment accuracy; (3) convenient order tracking to facilitate warranty, lot and serial number tracking; (4) improved customer service; (5) a readily customizable system which can be adapted to virtually any shipping operation; (6) a robust system having a long useful life; (7) graphical user interface screens for easy training and use; and (8) greatly reduced implementation costs in a system with increased effectiveness.

As more fully described herein, the logistics management system of the invention facilitates the process of shipping goods by a shipper having a predefined set of shipping requirements via a carrier having a predefined rate structure.

The system employs a multitasking operating system environment for running a plurality of computer processes substantially simultaneously. The environment has a means for interprocess communication whereby messages may be passed between the computer process. A supervisory server, running in the operating system environment, provides registration services to connect one or more computer processes to the interprocess communication mechanism. The system further employs at least one rate server, also running in the operating system environment, substantially simultaneously with the supervisory server. The rate server or servers provide access to carrier rate structure data and also provide predefined data processing services using the carrier rate structure data in response to a predefined set of request messages. The predefined data processing services include the providing of response messages based at least in part on the carrier rate structure data. More specifically, the rate server or servers have registration means for communicating with the supervisory server to invoke the registration services of the supervisory server and thereby establish a connection to the interprocess communication means. In the presently preferred embodiment there is one rate server for each carrier (e.g., U.S. Postal Service, Federal Express, United Parcel Service, etc.) and these servers are provided with a complete knowledge base of all rate structure data and shipping rules and regulations pertaining to that carrier.

In addition to the supervisory server and one or more rate servers, the logistics managements system also includes at least one client process running in the operating system environment substantially simultaneously with the supervisory server and also with the rate server or servers. The client process has a user interface for collecting input information from a user about a desired operation and for providing output information. More specifically, the client process also has registration means for communicating with the supervisory server, to invoke the registration services of the supervisory server, and thereby establish a connection to the interprocess communication means. The client process has a preprogrammed set of rules which are reflective of a given shipper's predefined set of shipping requirements. The client process also has a processing means for using the preprogrammed set of rules and using at least a portion of the input information to issue request messages to one or more rate servers and to interpret response messages received from the rate severs in order to provide the output information. In the presently preferred embodiment the client process is preprogrammed with a knowledge base to reflect the shipping organization's rules, regulations and practices. In this way, the client process presents a familiar view of day-to-day operations, as seen by the organization's personnel who are responsible for taking orders, packaging goods and shipping goods to customers. Because the sometimes complex rules and regulations of the carriers are fully handled by the rate servers, users interacting with the client process do not need to have a full and complete understanding of the carrier's rules and regulations in order to properly ship goods in a cost-effective and timely manner.

As more fully set forth herein, the supervisory server, the rate server or servers and the client process or processes are interoperable through the interprocess communication means (a) to receive input information from a user via the user interface of the client process, (b) to use the input information to issue a request message to the rate server via the interprocess communication means, (c) to process the issued request message and thereby cause a response message to be generated by the rate server, (d) to send the response message to the client process via the interprocess communication means, and (e) to provide output information based on the response message. The output information can range from simply displaying information on a screen to the user, to printing a mailing label or manifest or to updating records in a company database.

For a more complete understanding of the invention, its objects and advantages, reference may be had to the following specification and to the accompanying drawings.

DESCRIPTION OF THE PREFERRED EMBODIMENT

The logistics system of the invention serves as a management tool for the automated order processing, packaging, shipping and transportation of goods. The system is highly flexible and adaptable and thus the invention can be implemented in many forms. Therefore, in order to illustrate the principles of the invention an exemplary order processing, packaging and shipping operation will be illustrated and described. It will be understood that the invention provides a collection of building blocks or program objects which can be assembled in a variety of different ways to easily construct a logistics management system for practically any application.

Figure 1:
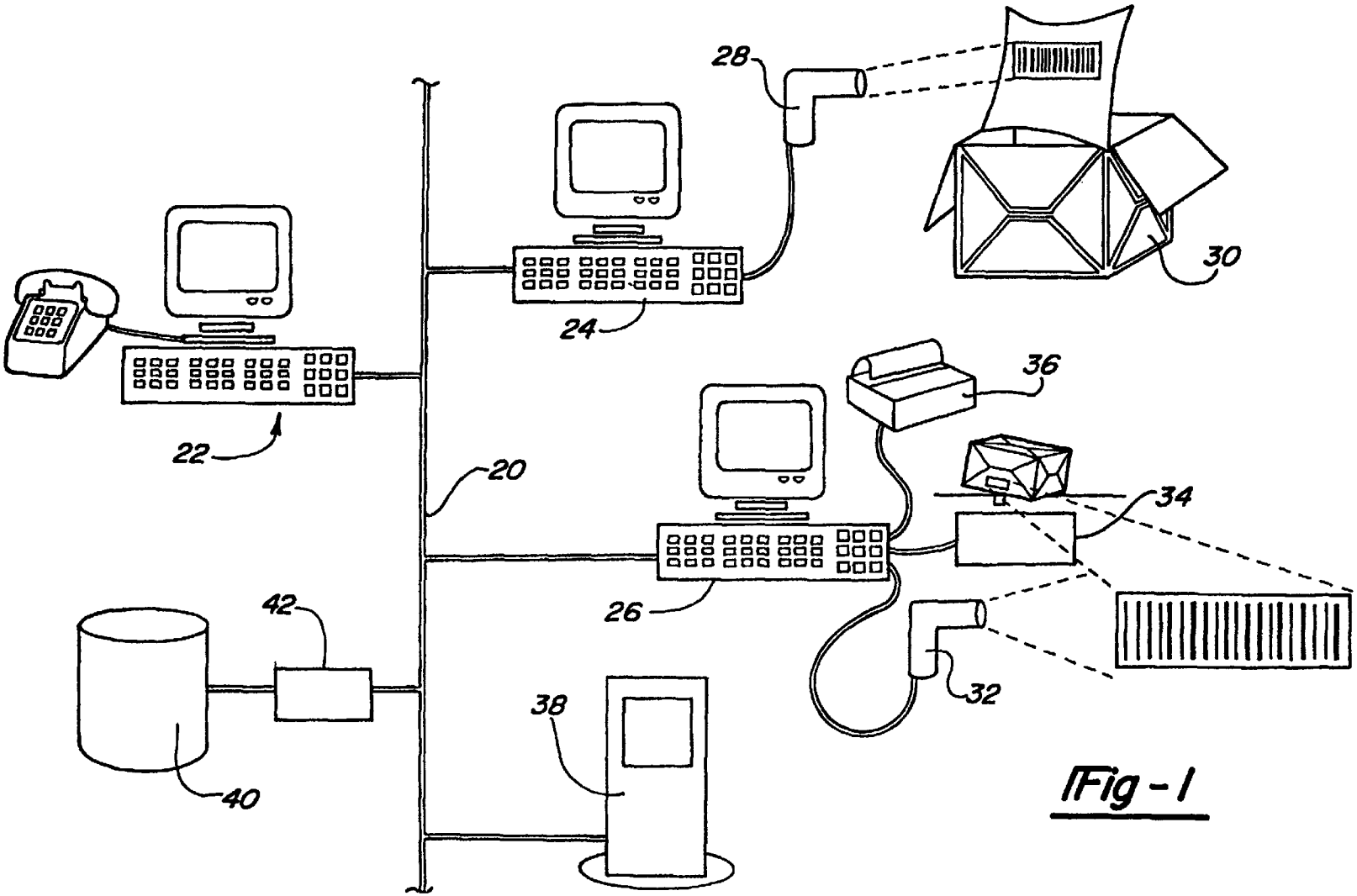
FIG. 1 illustrates an example application in which the logistics management system of the invention may be implemented.

Referring to FIG. 1, an exemplary application is illustrated. In FIG. 1, a networked architecture is illustrated in which a plurality of computers are interconnected by a local area network bus 20. Of course, the number of computers and the network architecture utilized are matters of design choice. The invention is not restricted in this regard and will operate on systems as small as a single standalone computer and as large as a global-wide area network.

FIG. 1 illustrates a simple system which includes an order processing station 22, a packaging station 24 and a shipping station 26. The order processing station might ordinarily include one or more computer terminals through which order entry personnel input a customer's order. The order entry terminal may be integrated with a point-of-sale terminal or cash register or it may be associated with or connected with a telephone system through which customer orders are placed. In this regard, while most order entry terminals are designed to be operated by an order processing clerk, direct order entry by the customer via computerized telecommunications equipment is also envisioned.

The order packaging station may also comprise one or more computer terminals to which a bar code scanning device 28 may be optionally attached. The scanning device would be used, for example, to scan the universal product code (UPC) of each item as it is picked from the warehouse shelves and placed into the shipping container 30.

The shipping station 26 similarly may include one or more computer terminals to which a scanning device 32, electronic scale 34 and mailing label printers 36 may be attached. Preferably, the printers are capable of printing the necessary shipping documents, bills of lading, manifests and so forth, as well as the appropriate package labeling. If desired in the alternative, the package label may be preprinted (e.g. at the packing station) and the scanning device 32 may be used to read the label and thereby automatically enter the package identifying number into the system.

The logistics management system of the invention may be implemented in software and run from a variety of different computer platforms. Preferably, at least portions of the logistics management software are installed and run on each of the computer terminals illustrated in FIG. 1. In addition, the logistics management system software may also be installed and run on other computers attached to the network, such as computer 38. As will be more fully described below, the logistics management system is also capable of interfacing with non-native computer systems, e.g., previously existing company database systems, via an external processing management system. To illustrate this, an external database 40 is depicted in FIG. 1. The database may be resident, for example, on a mini-computer or mainframe computer used to store company financial records. If necessary, the external database system may be connected via a gateway 42 to the local area network bus 20.

Client/Server Architecture

The presently preferred logistics management system is implemented using a client/server architecture and a multitasking operating system. Although the presently preferred system runs under the OS/2 operating system, use of OS/2 is not a requirement. Any multitasking operating system can be used. A multitasking operating system was selected for the preferred embodiment because it permits multiple processes (and multiple threads) to run effectively simultaneously. The multitasking operating system thus allows multiple programs to run effectively simultaneously and to communicate with each other through an interprocess communications (IPC) mechanism.

One benefit of the multitasking operating system is that the present invention allows the logistics management task to be split into multiple pieces. This architecture is quite advantageous since it allows updates or changes to be effected with respect to part of the system without affecting the rest of the system. The client/server architecture derives benefit from the multitasking operating system by allowing the overall logistics management task to be subdivided along functional lines. As will be more fully explained below, the presently preferred embodiment places carrier-related information, such as shipping rates, shipping rules, time in transit information and the like in one or more rate servers. These servers are responsible for making all determinations regarding how a given carrier's rules and rate structures are to be interpreted. The presently preferred embodiment facilitates the particular shipper's requirements, such as order taking, order fulfillment, inventory control and the like, in one or more client applications. These client applications may be customized to conform quite closely to a given shipper's operation. These client applications call upon the necessary rate servers, as needed, for the appropriate shipping rates and shipping requirements of the selected carrier.

The multitasking operating system and the client/server architecture of the preferred embodiment comprises the logical structure of the logistics management system. The physical structure, i.e., how many computers are used and how those computers are interconnected, can vary widely and still implement the above-described logical client/server architecture. More specifically, the preferred embodiment is constructed to support distributed applications in which different pieces of the total client/server structure are run on multiple machines interconnected together via a network. In general, there is no limitation on how the respective client/server components are to be distributed across the network. Thus, for example, in the system illustrated in FIG. 1, any of the computer terminals associated with stations 22, 24 and 26, as well as computer 38, may host one or more client applications and one or more server applications.

Figure 2:
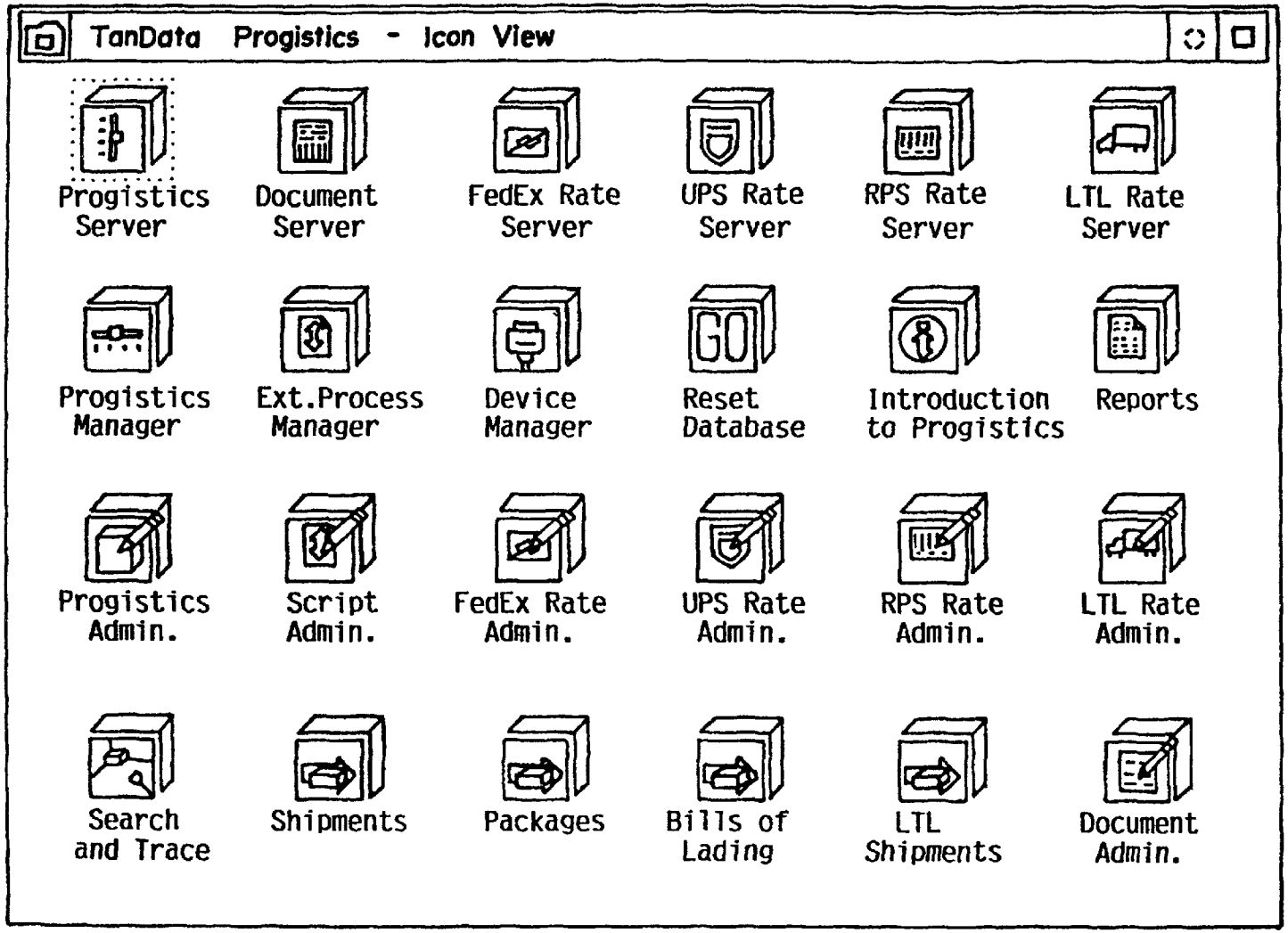
FIG. 2 is an icon view of the plurality of program objects which comprise a presently preferred embodiment of the logistics management system.

The present invention uses a plurality of program building blocks or program objects, each having a specific function within the overall client/server architecture. The building blocks or program objects which make up the presently preferred embodiment are illustrated collectively in FIG. 2. FIG. 2 is illustrated in the form of a window or folder 50 containing a plurality of icons, each representing one of the program objects which make up the preferred embodiment. A brief description of each of these objects is presented below. Further details of the manner in which these objects communicate with one another and further details of the objects construction will be presented thereafter.

The Presently Preferred Program Objects

The presently preferred program objects are described in Table I below. Broadly speaking, these objects can be classified as being client objects or server objects. For example, the objects bearing the designation "server" or "manager" function as server objects. The objects designated as "client" or "administration" (admin) function as client objects.

More specifically, servers such as rate servers encode the knowledge required to answer questions such as how to calculate shipment rates or how to band shipments. Thus, rate servers provide the knowledge regarding a specific carrier's requirements. Typically, rate servers are provided with specific details regarding a given shipment's weight or the required delivery date by a client application. Also typically, rate servers do not have user interface screens. Servers simply appear as icons on the user's desktop and wait to be asked a question by a client. Provided the question includes the right details, the server will then return the correct answer to the client. Servers can reside anywhere on a network, so they may not necessarily be visible as icons on a particular user's computer screen.

Clients are principally responsible for asking specific questions of the servers. Clients have responsibility for gathering and displaying information. As such, clients usually have user interface screens through which a user can enter data or input data through an attached scanning device.

Manager objects are principally responsible for managing aspects of the logistics management system, such as the communication between clients and servers, or communication with printers, scanners and the like. Administration objects are principally responsible for providing a user interface mechanism whereby the user may edit system settings and scripts.

TABLE I

| Program Object | Function |
|---|---|
| Supervisory Server: | Acts as a repository for system wide information. |
| Document Server: | Manages the client requests for non-carrier document formats and the printing of those documents. |
| FedEx Rate Server: | Manages the Federal Express rates, carrier rules and documentation requirements. |
| UPS Rater Server: | Manages the UPS rates, carrier rules and documentation requirements. |
| RPS Rate Server: | Manages the RPS rates, carrier rules and documentation requirements. |
| LTL Rate Server: | Manages the LTL rates, carrier rules and documentation requirements. |
| Supervisory Manager: | Acts as a repository for machine-specific information. |
| Ext. Process Manager: | Manages the client requests for access to outside services such as remote databases and remote computers. |
| Device Manager: | Manages the client requests for access to outside devices such as printers, scanners, and scales. |
| Reset Database: | Resets the sample database to its default values to facilitate training exercises. |
| Introduction to the system: | A tutorial for the new user. |
| Reports: | Double-clicking this icon will run a third party report generator program. |
| Supervisory Administration: | Allows the user to edit system settings, manage shipper information and allows users to send messages to other computers. |
| Script Administration: | Allows the user to create and edit scripts used by the External Processing Manager. |
| FedEx Administration: | Allows the user to configure the Federal Express Server settings such as account numbers, EDI settings and to close out the manifests. |
| UPS Rate Administration: | Allows the user to configure the UPS Server settings such as account numbers, rates, discounts and to close out the manifests. |
| RPS Administration: | Allows the user to configure the RPS Server settings such as account numbers, rates, discounts and to close out the manifests. |
| LTL Administration: | Allows the user to configure the LTL Server settings such as account numbers, and rates, discounts and to close out. |
| Search and Trace: | A client application which allows the user to search and trace specific packages, shipments and orders. |
| Shipments: | A client application which allows the user to process shipments comprised of multiple packages per order. |
| Packages: | A client application which allows the user to process shipments comprised typically of one package per order. |
| Bills of Lading: | Allows the user to create bills of lading for LTL Motor Freight Shipments. |
| LTL Shipments: | Allows the user to create and rate bills of lading for LTL Motor Freight Shipments. |
| Document Administration: | Allows the user to configure the Document Server with UCC-128 serial number information and document attributes. |

Figure 3A:
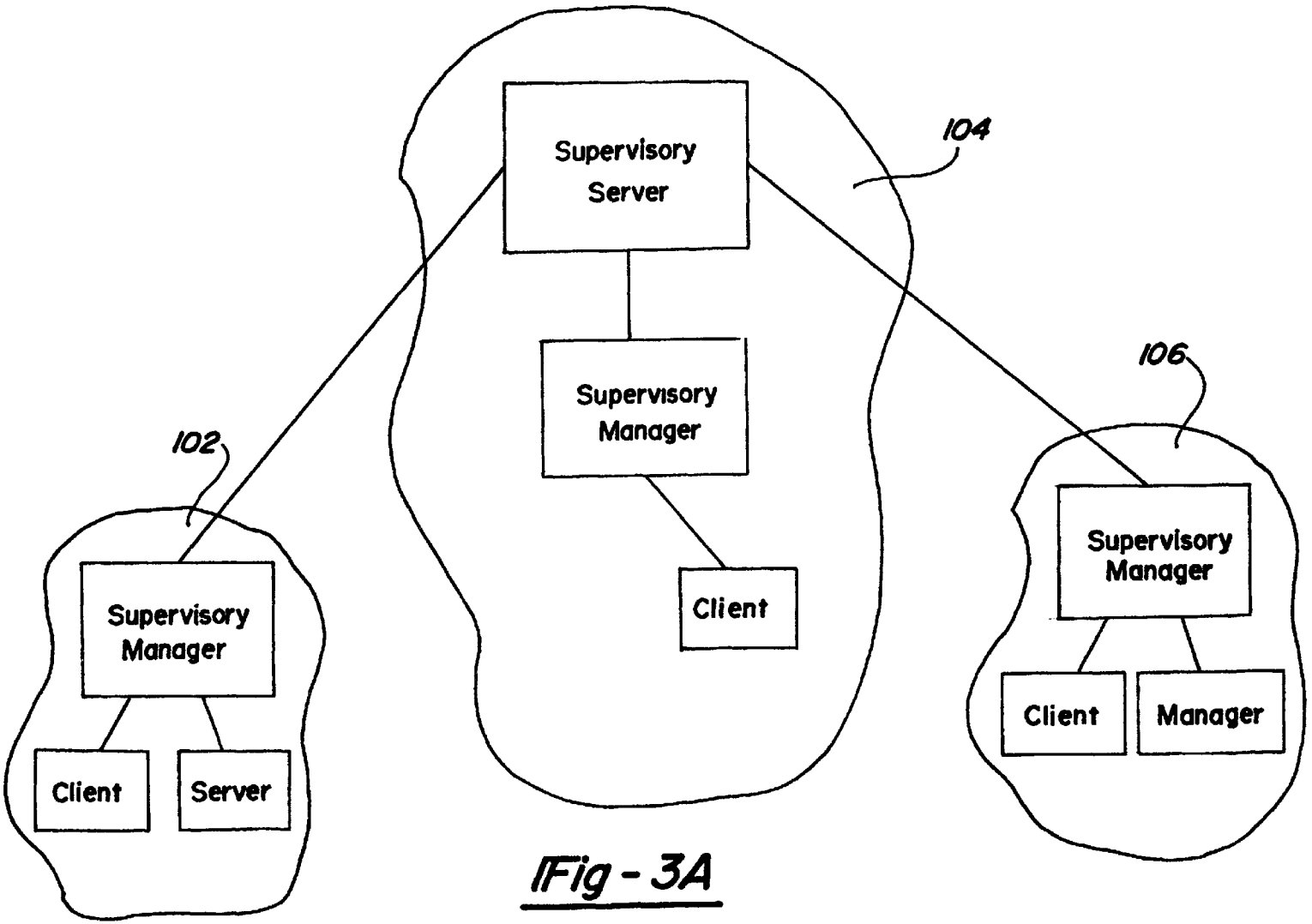
FIG. 3A is a block diagram depicting a distributed architecture embodiment of the invention.

In an actual implementation of the system, one supervisory server and at least one supervisory manager would be provided. Specifically, one (and only one) supervisory server is provided for the entire network. In addition, one supervisory manager is provided for each CPU that will be running client or server applications on the network. This is illustrated in FIG. 3A, which depicts a distributed architecture employing three networked CPUs 102, 104 and 106. As illustrated, the supervisory server and one supervisory manager are running on CPU 104. Supervisory managers are also running on CPUs 102 and 106. For illustration purposes a UPS rate server object and a UPS rate administration object are also running on CPU 102; whereas a shipments client and a device manager are running on CPU 106. Thus, FIG. 3A represents one possible configuration assembled from the collection of presently preferred program objects.

Figure 3B:
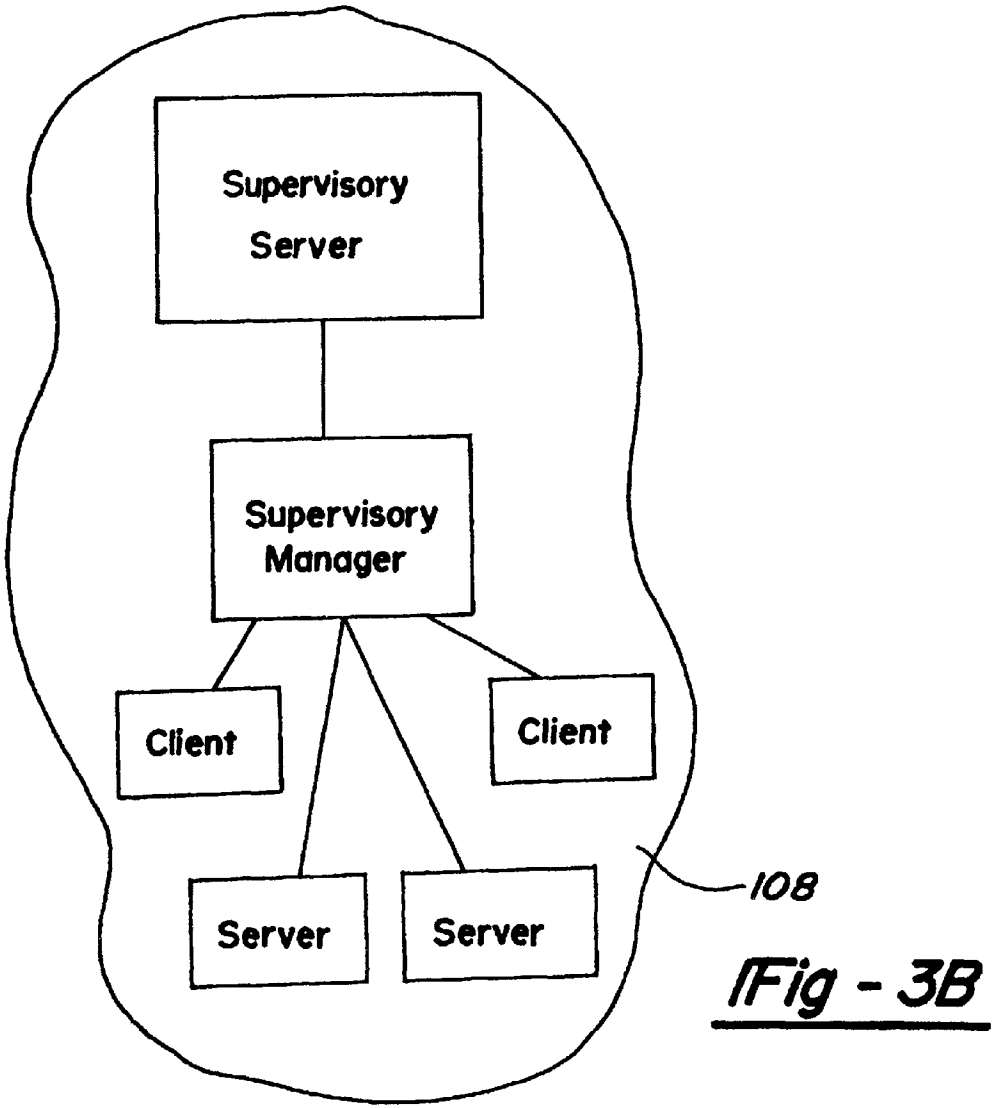
FIG. 3B is a block diagram illustrating a single, standalone CPU embodiment of the invention.

Although multiple CPU, distributed architecture installations represent a powerful configuration, it is possible to implement the invention on a single, standalone, CPU. This is illustrated in FIG. 3B, in which a standalone CPU is indicated at 108. As illustrated, this simple configuration includes a supervisory server and supervisory manager, along with any other program objects which may be required for the task being performed. Thus, in the example illustrated in FIG. 3B several rate servers and a packages client have been illustrated.

Application User Interface

Referring to FIGS. 4A–4L, the presently preferred user interface will now be described. In general, the client/server program objects, illustrated as icons in FIG. 2, may each have a user interface in the form of a screen or window through which the user can enter information, make command selections, and look up information. In practice, the user interface may vary in appearance and function, as dictated by the particular task to be performed. Thus the user interface screens illustrated in FIGS. 4A–4L are intended merely as examples in accordance with the presently preferred embodiment.

Overall Icon View—System Folder

The presently preferred embodiment places icons for all user-selectable program objects in the Logistics Management System folder or window, shown in FIG. 2. In this regard, the window shows a sample set of icons for the presently preferred system. Each icon is a pointer to a separate client, manager or server object. By double-clicking on the appropriate icon, its object is started. For example, double-clicking on the Shipments Client starts that program object running. Typically, once an object is started, it continues to run and is able to communicate with other program objects via the interprocess communications (IPC) mechanism.

Shipments Client

Figure 4A:
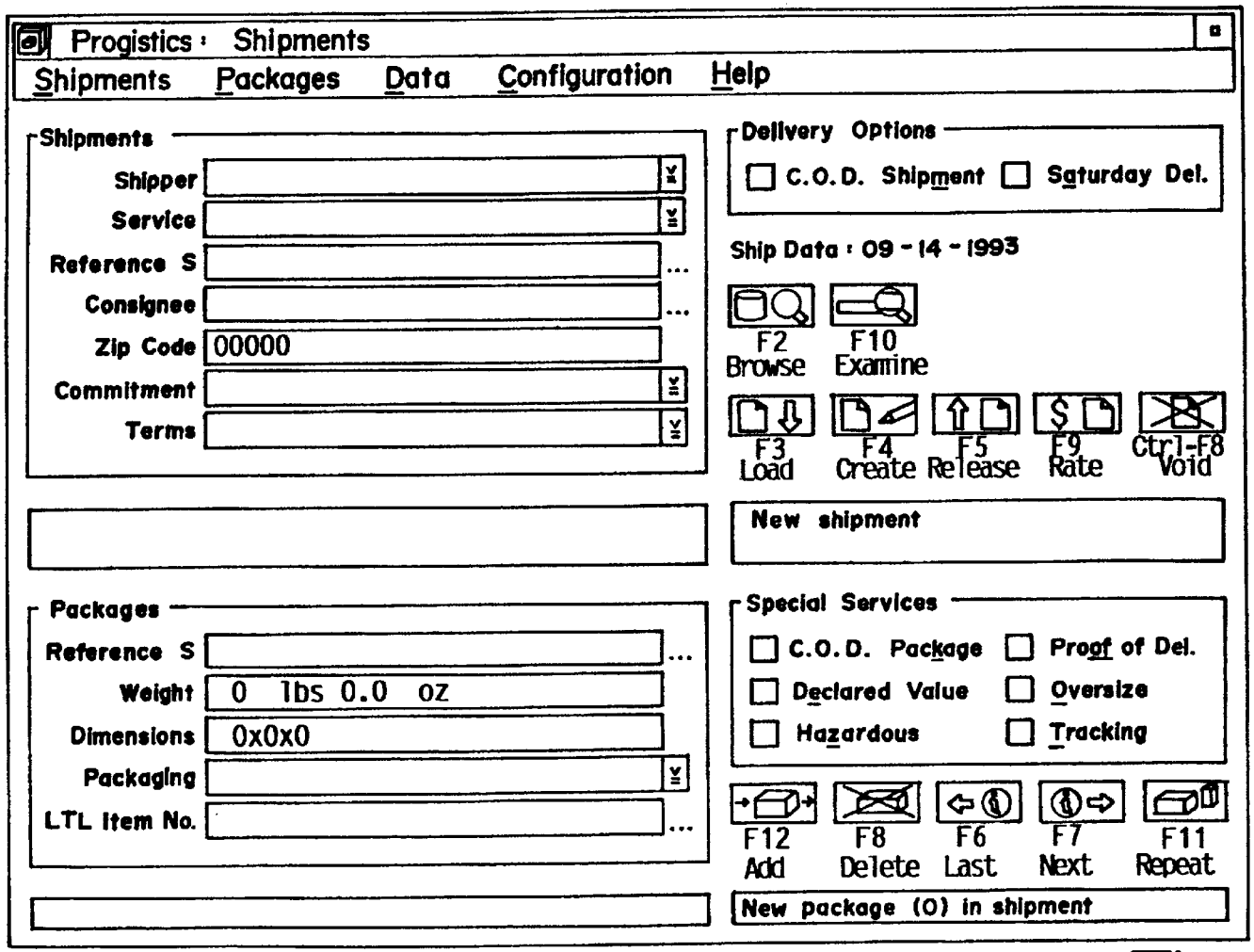
FIGS. 4A–4L, inclusive, represent exemplary user interface screens of the presently preferred embodiment.

Shown in FIG. 4A, the Shipments client accepts user input for the routing, rating and documentation of a group of packages comprising a shipment. Multiple shipper accounts are allowed and the desired account may be selected from the Shipper "drop-box." Similarly, the service is selected from the Service box. Alternatively, the service may be set to Best Way and the system will choose the least cost carrier which meets the transit time requirements indicated in the commitment field.

The operator types or scans the Reference # (such as order #, pick ticket #, . . . ) and the system may be set to look up the associated information form one or more local and remote sources such as databases and mainframe or minicomputer terminal sessions. The upper left quadrant of the screen is to record information for the shipment as a whole.

The lower left quadrant is used to record specific information for each package in the shipment. In all client data entry screens there are several special data entry provisions. Any field which has an ellipsis ( . . . ) at its right edge has additional related fields of data available to be "examined" or edited by touching the F10 key or clicking the Examine icon. A popup window with the associated fields is displayed for the user. In addition, most fields may be set up to "browse" available valid entries. They may browse from database records or from "hard-coded" values in scripts.

The Shipments client and most other clients are capable of processing shipments of mixed modes; e.g. small parcel ground, small parcel air, LTL motor freight, air freight, and TL motor freight.

Packages Client

Figure 4B:
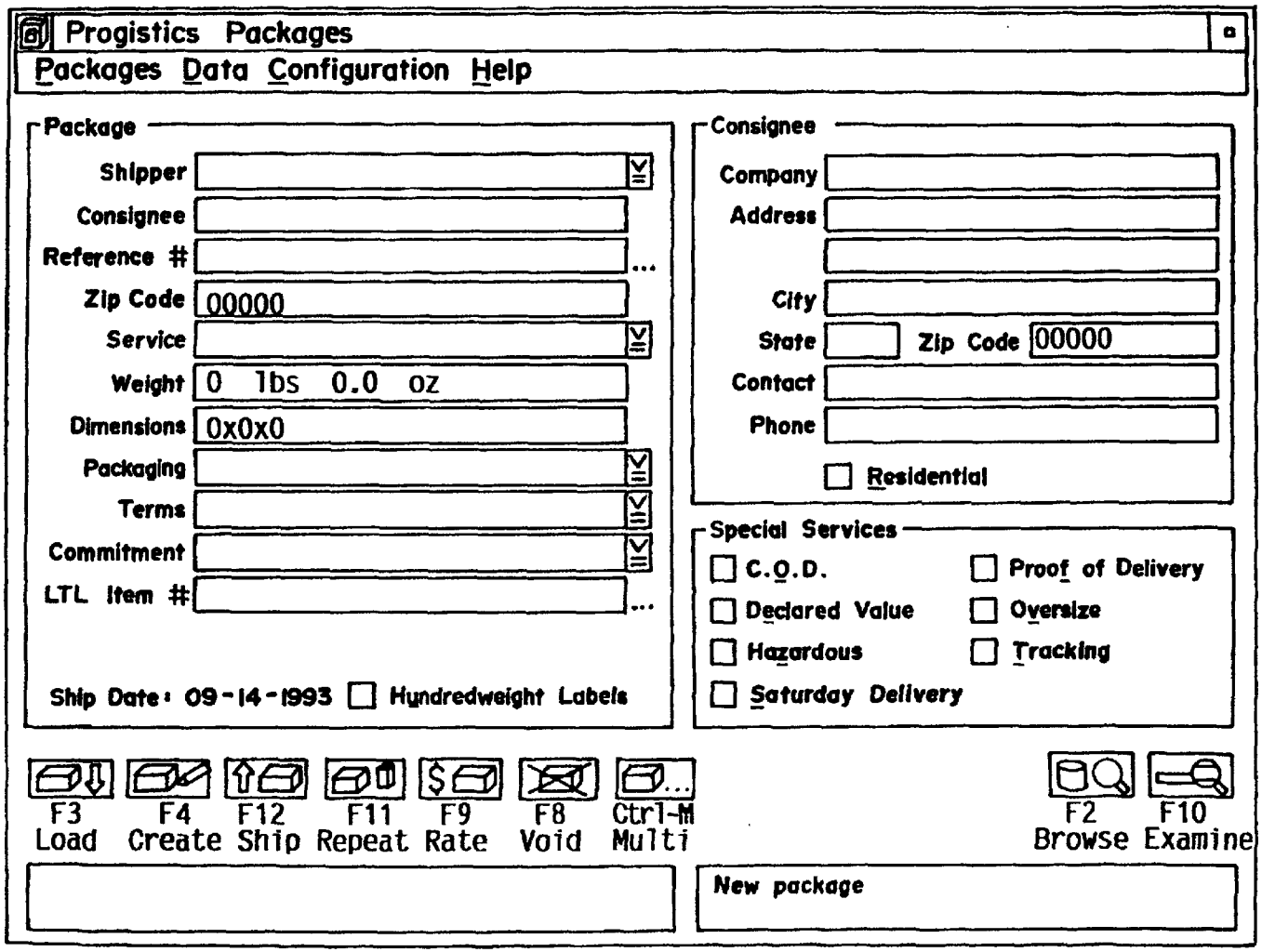

Shown in FIG. 4B, the Packages client is designed to facilitate the entry and processing of shipments which typically consist of single small packages. Although, like most other clients, it will handle multiple modes of shipment, it is best suited for single piece shipments. If a multi-piece shipment is encountered, the user may touch CTRL-M or click the Multi button and the shipment is accomodated.

Script Administration

Figure 4C:
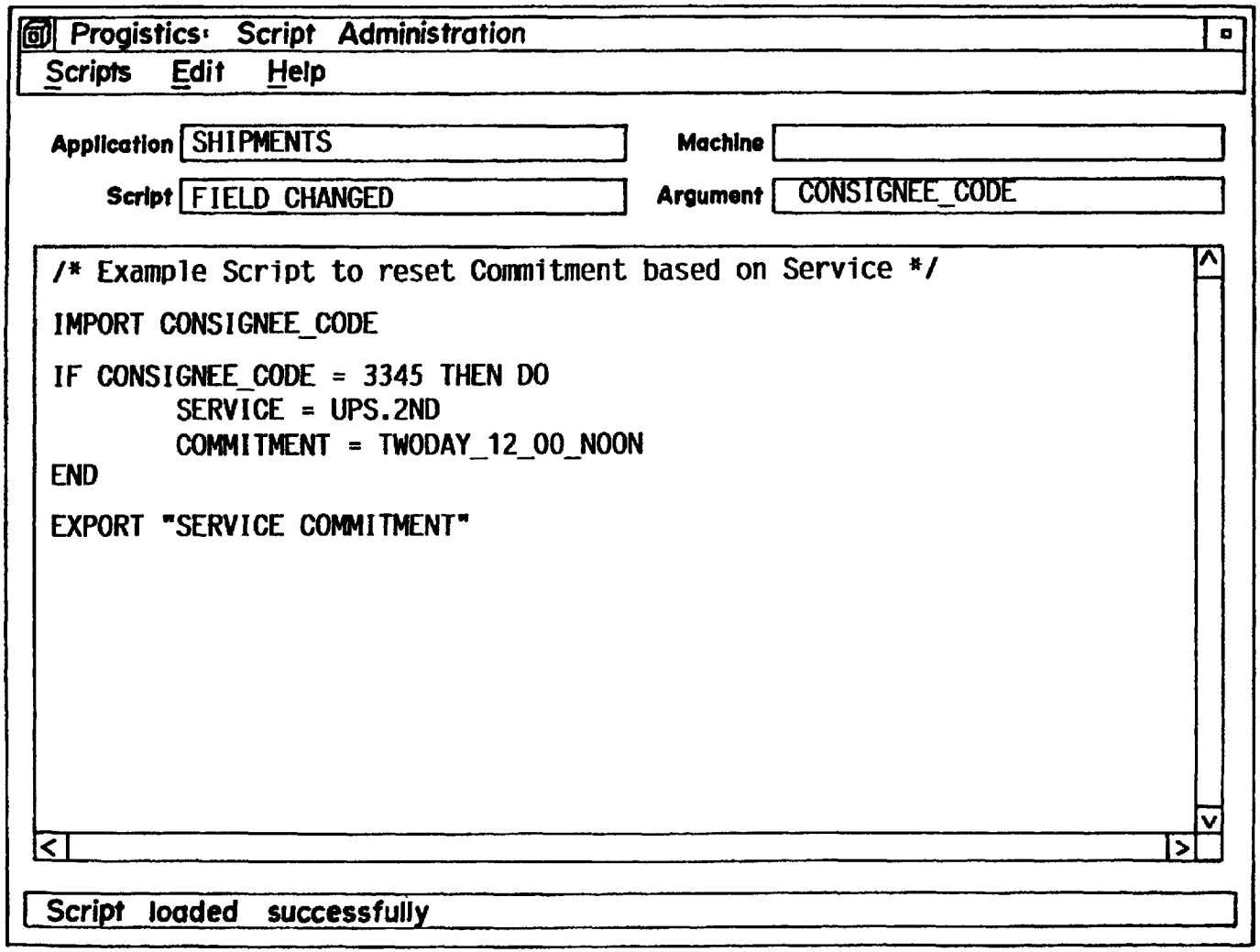

The Script Administration object, shown in FIG. 4C, allows the creation and editing of scripts for the modification of default behavior of the clients. A script may be triggered in various ways, such as upon the changing of the contents of virtually any field, upon the pressing or clicking of the function buttons on the client screen, upon the opening or closing of the client, and so on. In the illustration of FIG. 4C, the Shipments client is being operated upon to modify the Commitment terms based on the type of Service being used by the shipper.

UPS Rate Adjustments

Figure 4D:
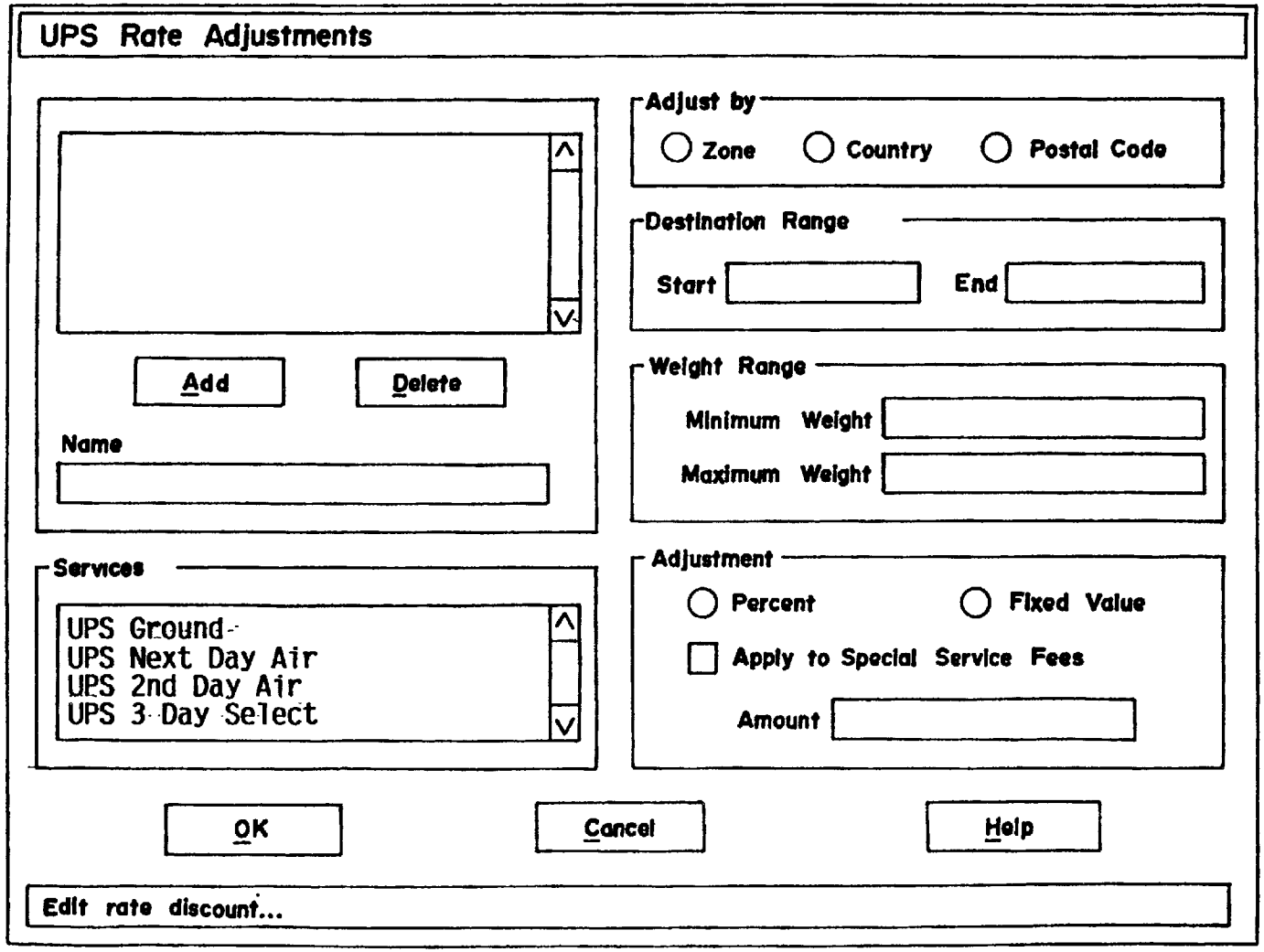

Referring to FIG. 4D, the UPS Rate Adjustments program object and substantially similar objects for each of the carrier rate servers installed on the system, allow the user to adjust the discounts and incentive programs extended to the shipper by the carrier. Existing discounts may be edited, or new incentive programs not yet envisioned by the carrier may typically be created by the user within the flexible structure of this client type. Adjustments may be qualified by destination (ether zone, postal code or destination country) and by weight range. Adjustments may be calculated as percentages of fixed amounts and include or exclude special service fees. If desired multiple adjustments may be created and put into effect.

Serial Port 2 Configuration

Figure 4E:
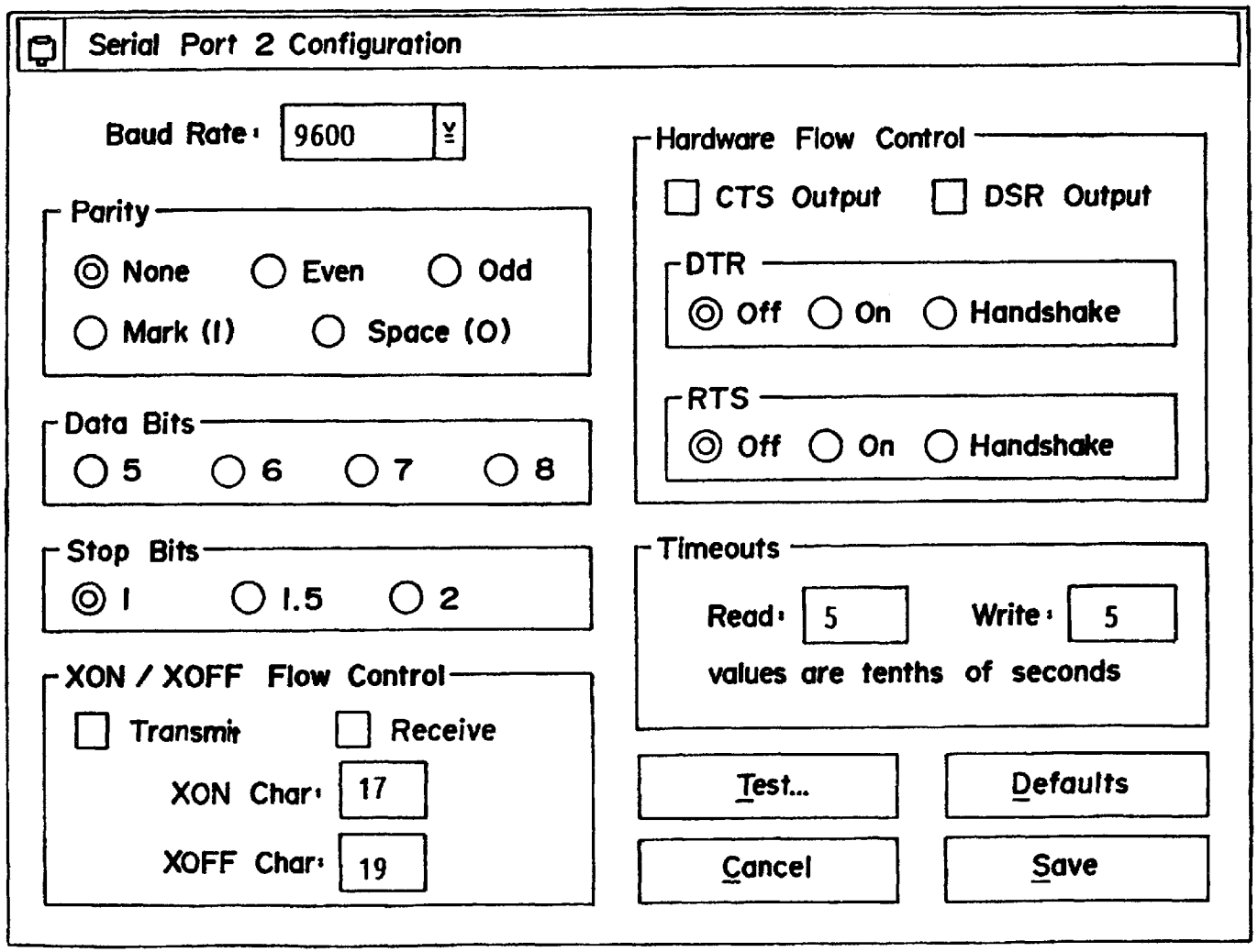

The Serial Port 2 Configuration screen, shown in FIG. 4E, is a part of the Device Manager object. It allows the adjustment of basic serial port setup values. By clicking on the "Defaults" button, the default settings appropriate to the specific attached device are automatically entered. The "Test" button provides a facility for sending data to and receiving data from the attached device. Additional aspects of the Device Manager object are discussed in connection with FIGS. 4G–4L, below.

Document Administration

Figure 4F:
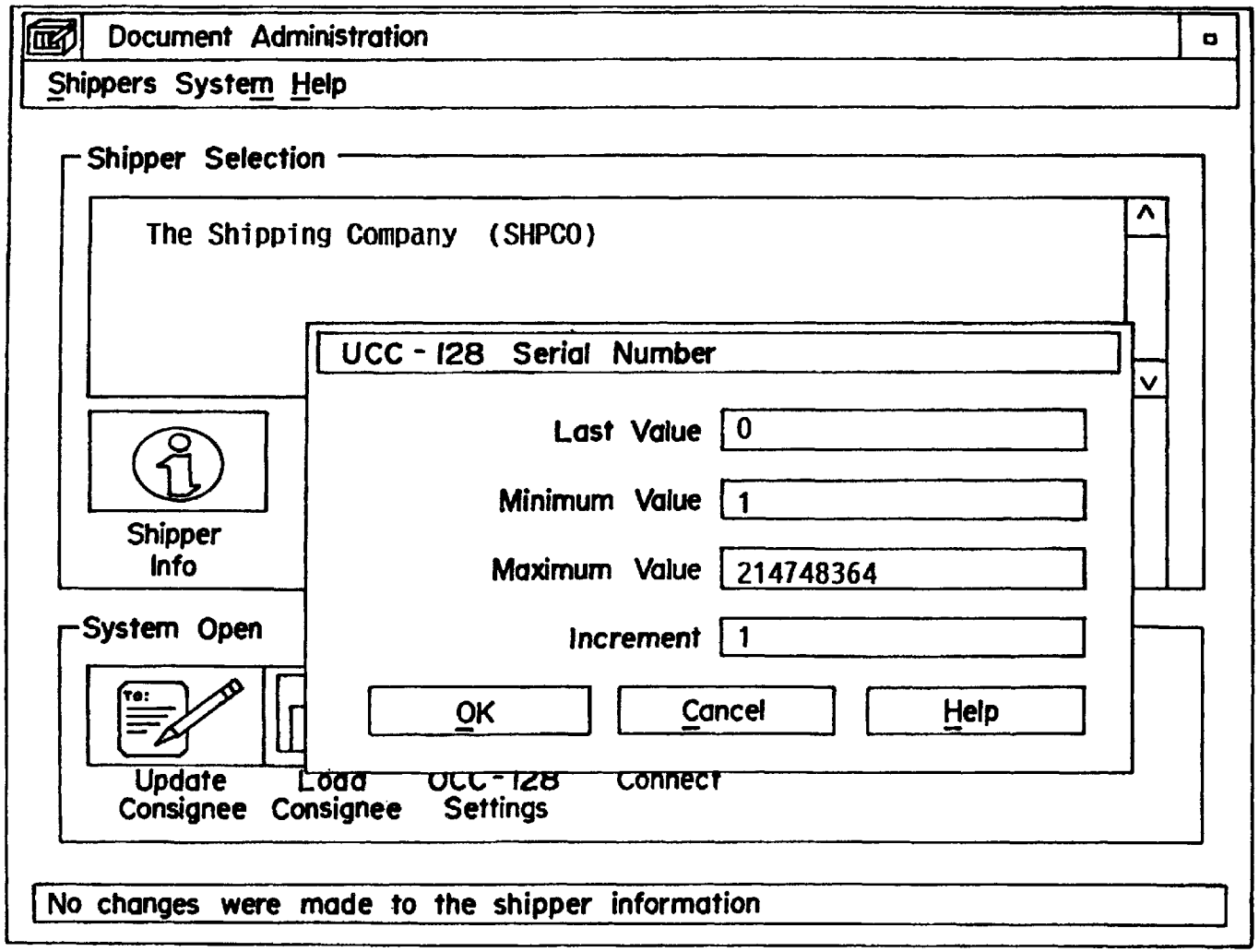

The Document Administration object, shown in FIG. 4F, allows the user to adjust settings for the UCC-128 standards of serialized container marking and Electronic Data Interchange. It allows the user to load and store consignee names and addresses and UCC-128 specific values. It also allows the user to edit the database and settings as changes may occur.

Document Server

The document server, illustrated as one of the icons in FIG. 2, allows any client to print almost any type of document, including shipping labels, waybills and manifests. The information needed to print a document is processed through a script. This allows the data to be brought in from any number of sources such as databases, mainframes, files or user-entered information from a client application. Also, one document format can serve several client applications and any particular processing needs a user might have. This is quite readily accomplished due to the fact that all data is passed through scripts. Thus, for example, one user might look up the export information for a FedEx international document from a database, while another user might wish to hand enter this data. Both of these tasks can be accomplished by a single document format and without the need for custom programming.

Device Manager Object

The Device Manager provides a device-independent means of interfacing with peripheral devices. Device drivers can be added or removed without modifying the software. The Device Manager also provides integrated testing tools.

The Device Manager of the presently preferred embodiment has the ability to monitor power, through an uninterruptible power supply connected to the system. If power fails, the other applications are notified, and an orderly shutdown of the system will take place. This prevents loss or corruption of data by sudden power outage or by subsequent failure of battery power, once the reserves of the uninterruptible power supply have been depleted. The monitoring service provided by the Device Manager can shut down multiple machines on a network connected through one uninterruptible power supply.

Figure 4G:
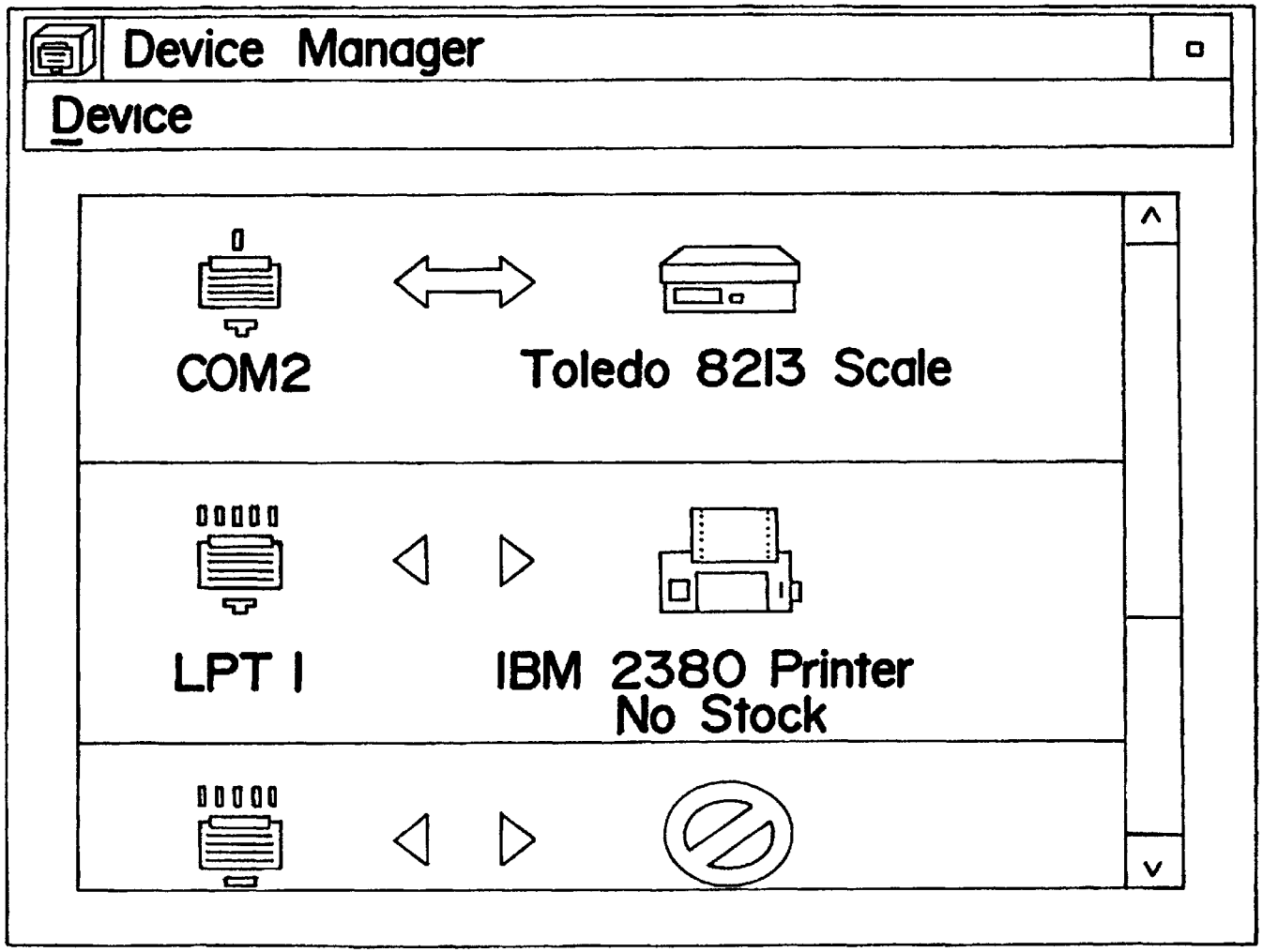
Figure 4H:
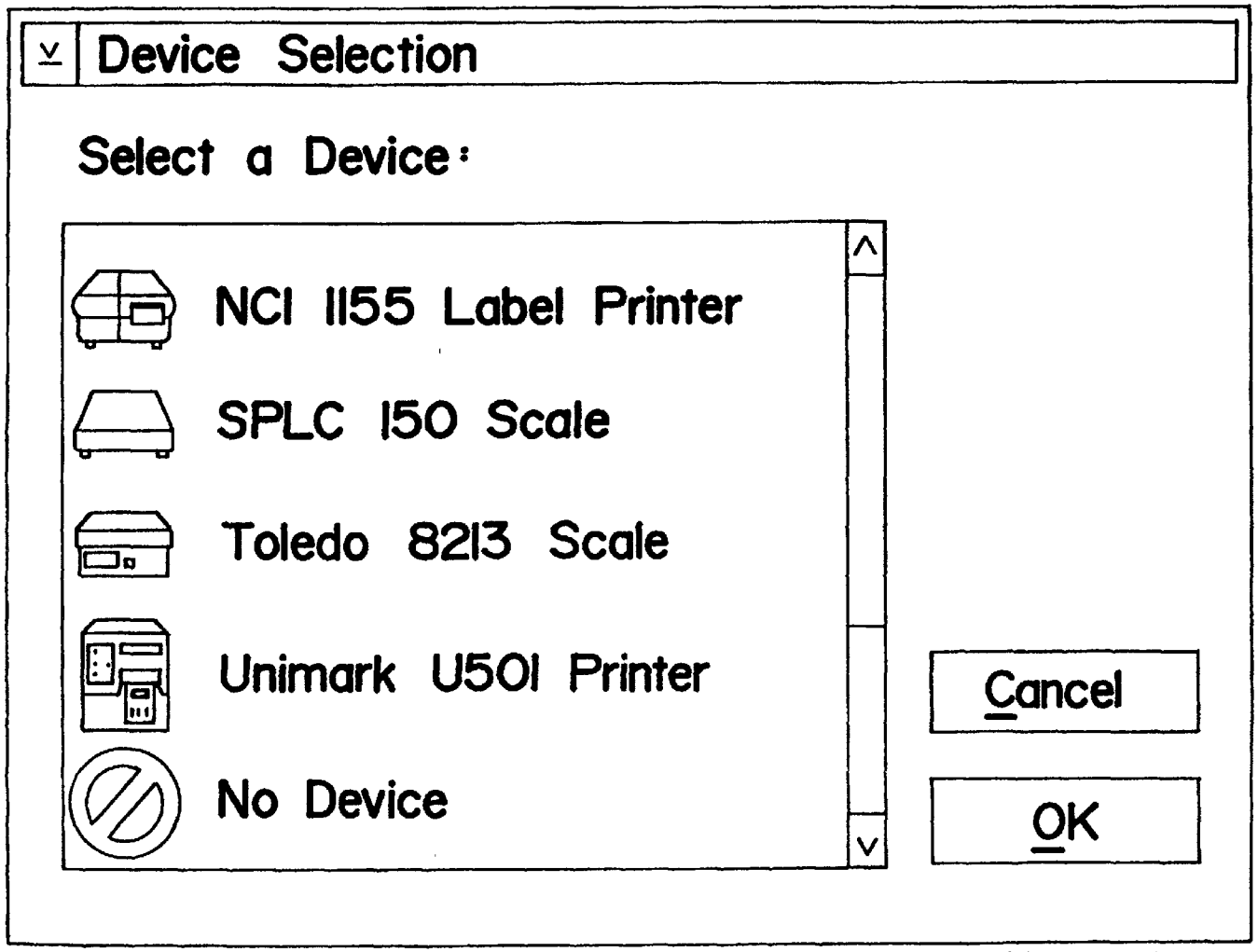
Figure 4I:
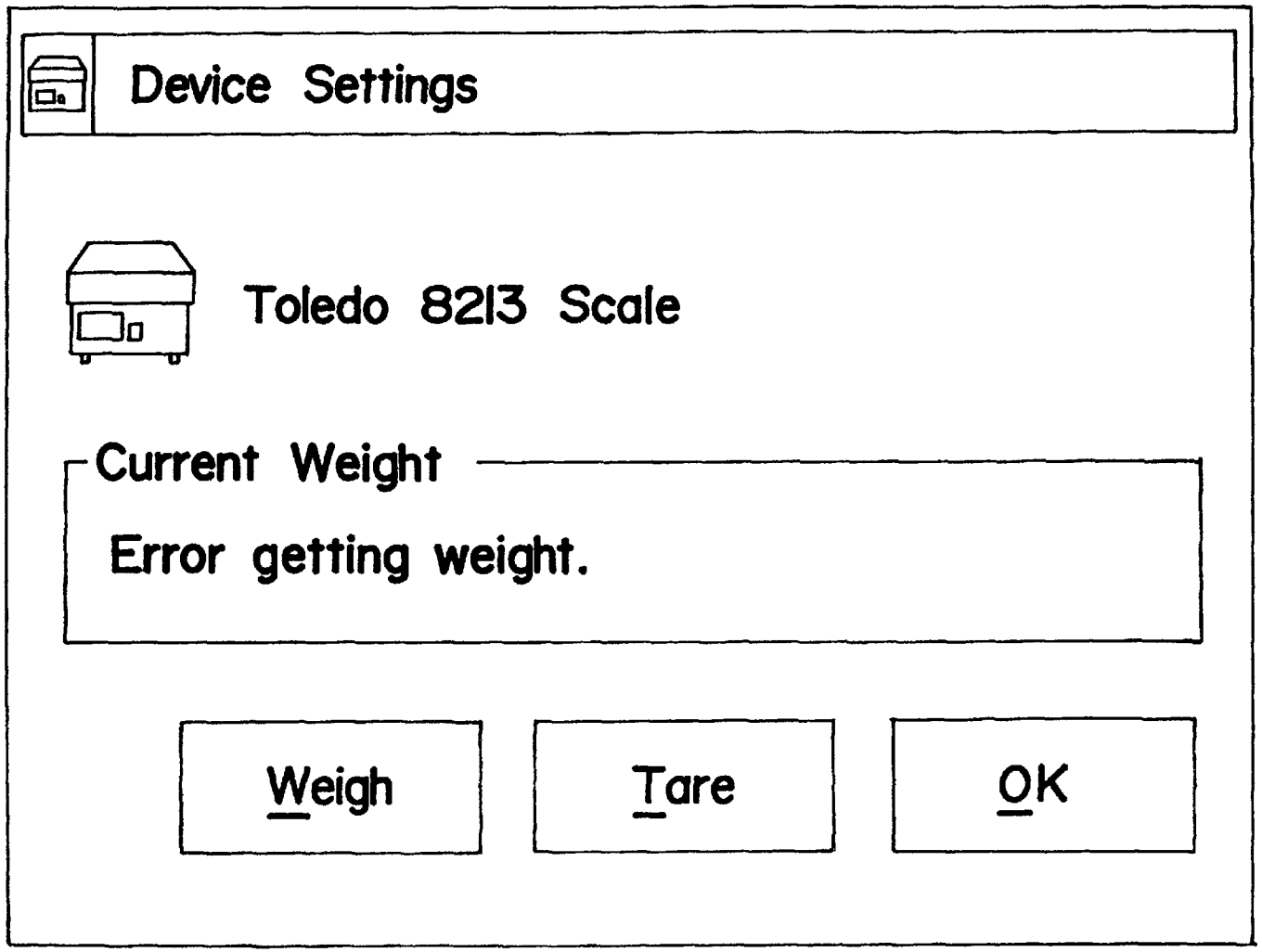
Figure 4J:
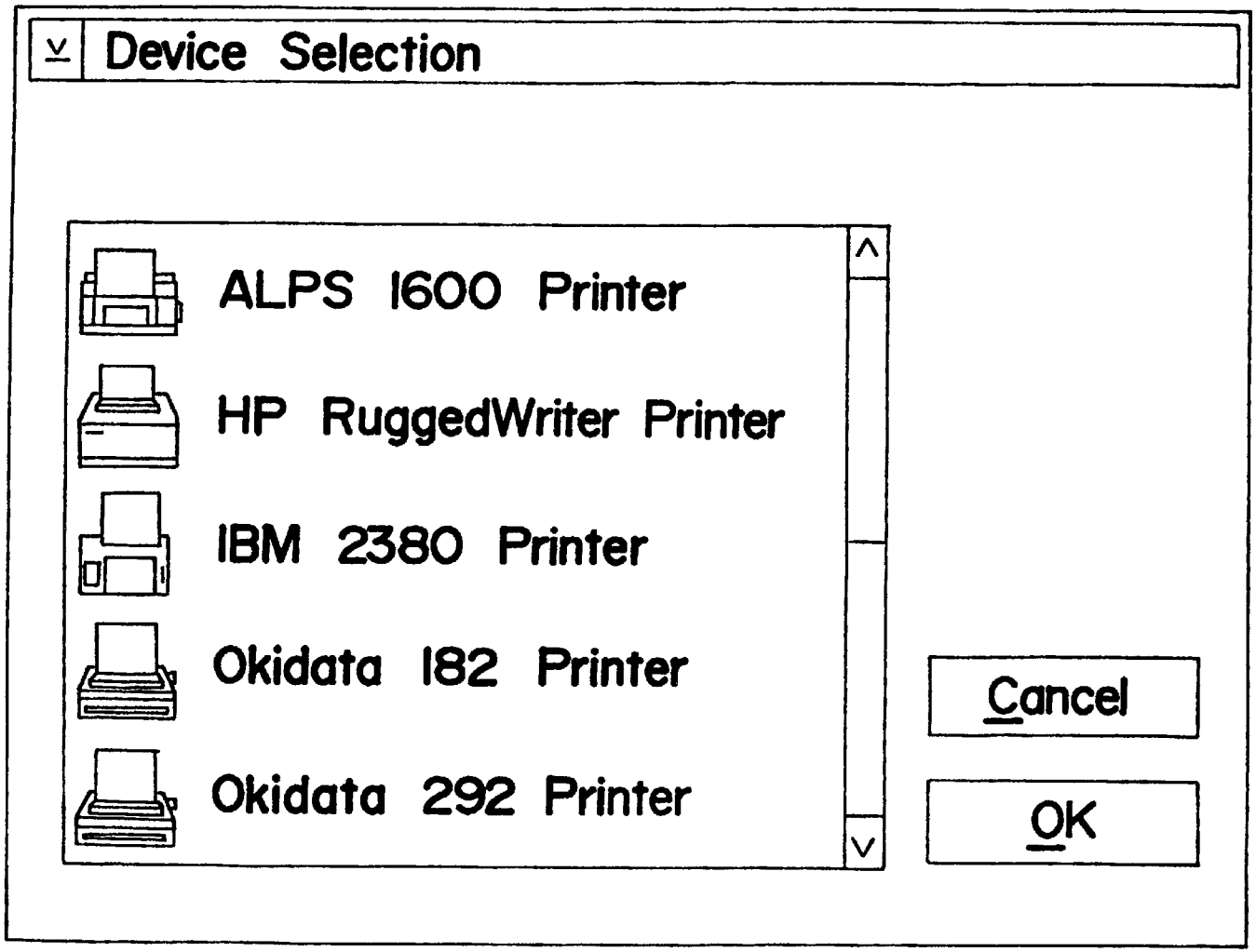

Referring to FIGS. 4G–4L, additional capabilities of the Device Manager object are illustrated. In FIG. 4G the communications port COM2 is shown as assigned or connected to an electronic scale, in this case a scale designated Toledo 8213 Scale. The parallel port LPT1 is shown as being assigned or connected to a printer, in this case a printer designated IBM 2380 Printer. Beneath the printer designation there appears a notation "No stock" which indicates that no particular paper stock has yet been designated.

Double-clicking on the COM2 icon brings up the configuration screen shown in FIG. 4E. Selecting the purl-down menu designated "Device" brings up the device selection menu shown in FIG. 4H. Using the device selection menu the Toledo 8213 Scale may be selected, as illustrated. Thereafter, by returning to the device manager menu of FIG. 4G, the Toledo 8213 Scale icon may be double-clicked to bring up the device settings menu illustrated in FIG. 4I.

Figure 4K:
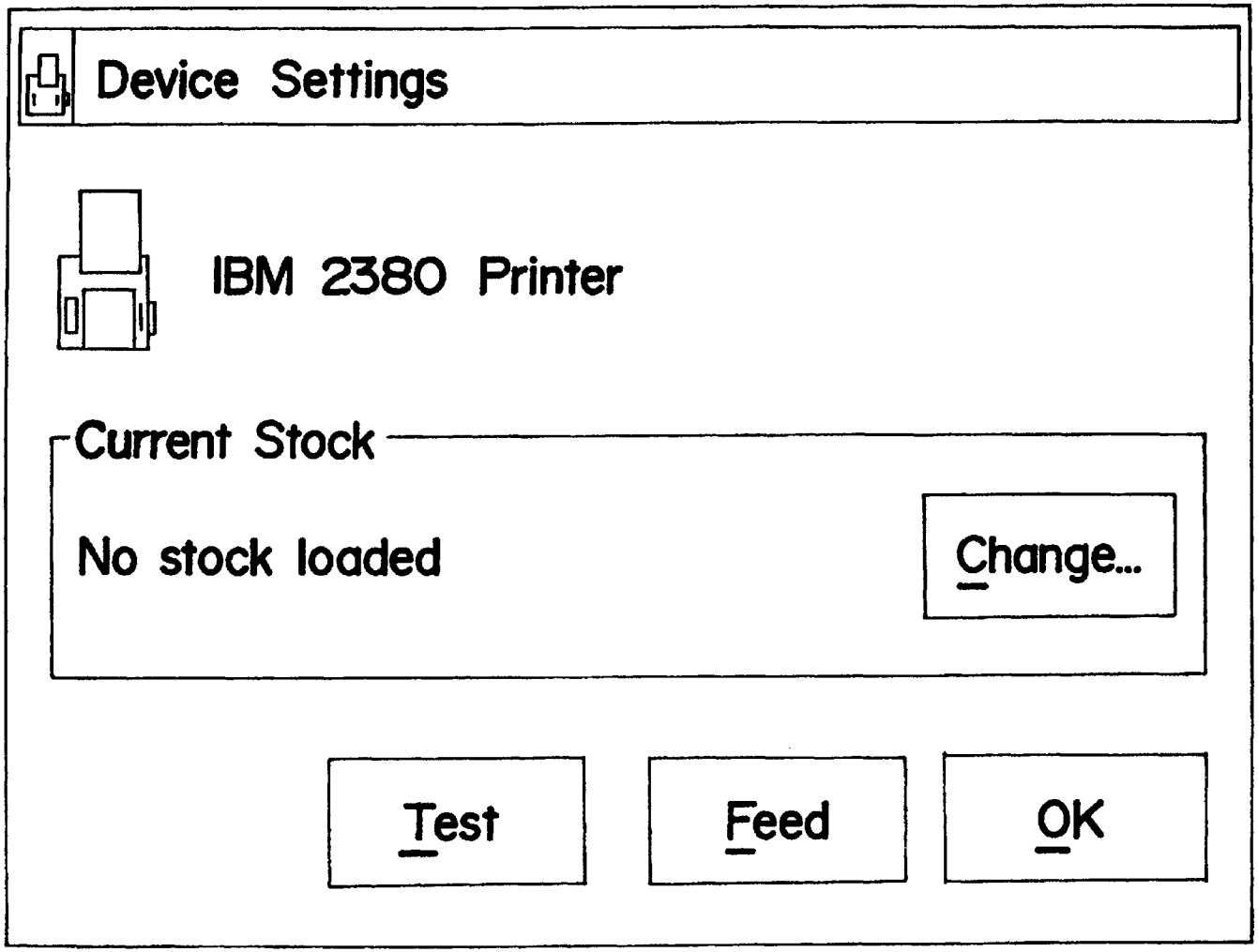
Figure 4L:
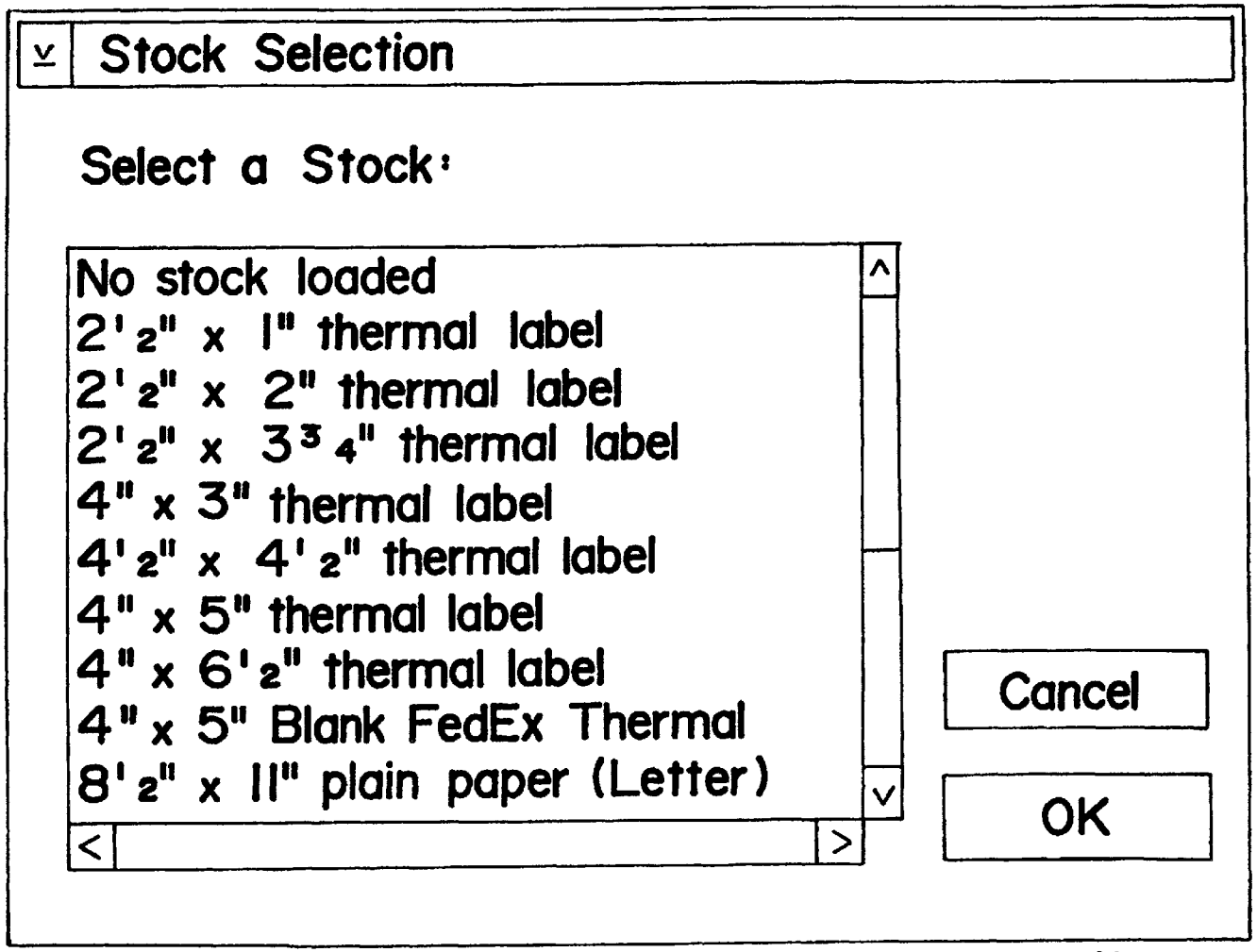

Alternately, from the device manager menu of FIG. 4G, the parallel port LPT1 may be selected (by single-clicking) and configured by again accessing the "Device" menu option. In this case, referring to FIG. 4J, the IBM 2380 printer may be selected, as illustrated. Thereafter, the user may click "OK" to return to the device manager screen. FIG. 4G. From the device manager screen the user can double-click on the printer icon to bring up the appropriate device settings menu (FIG. 4K) for that device. Referring to FIG. 4K, note the Current Stock states "No stock loaded." If desired, the user can change the current stock by clicking on the change button. This action brings up the stock selection menu of FIG. 4L.

DETAILED DESCRIPTION OF CLIENT/SERVER OBJECTS

The client/server architecture utilized by the logistics management system affords a great deal of flexibility. The client and server program objects are designed to work independently of one another, communicating with one another through a tokenized message handling mechanism discussed below. In this way, rate server data and user data are separated from one another. The advantage of this is that when a given carrier changes the way rates are handled, the affected rate server can be modified (to change the type or amount of data stored in that rate server, for example) without affecting the user's data in any way. This separation is important since carrier requirements and carrier service options may change at any time.

The presently preferred embodiment implements an internal version numbering scheme which provides a mechanism to allow client applications to determine what version of a server they are communicating with. In so doing, the client applications are able to make any necessary adjustments or to disconnect from that server if incompatibilities are found. This provides greater reliability, since server applications are given the ability to handle communications with servers intelligently.

Separation between client and server objects also makes possible an automatic updating capability whereby a user's existing setup information is automatically merged into a new installation when an application is updated or reinstalled. This reduces the amount of setup time due to reinstallation.

Each server of the presently preferred embodiment has built-in debugging capabilities which allow server transactions to be displayed on the screen or logged to a file for later analysis. The presently preferred rate servers optimize shipments to minimize cost through the use of shipment pricing rules supplied by the carrier. Optimization occurs "live" as a shipment is being processed, or, alternatively, at the end of the day when all packages shipped are then optimized. The rate servers can directly access carrier-supplied data, such as Federal Express routing and rate file data. This allows the user to load in new rate information as soon as such information is provided by the carriers. In addition, the rate servers of the presently preferred embodiment have the ability to rate and process a package, but to withhold it from the manifest until notified to do so. This allows "pack and hold" or future shipping. This is important in an automated system where a package may be processed upstream, but not placed on the manifest until it reaches the shipping dock.

In the presently preferred embodiment client applications have editable bar code templates, to allow data to be entered via a barcode scanner. Because the templates are editable, they can be added to, deleted from or modified by the user without the need for additional programming. Clients can also process in "batch" mode, reading data from a source and sending that data to the appropriate rate servers for processing. The sources for data can include databases, files or direct connection to a host computer via serial or network connection.

Figure 5:
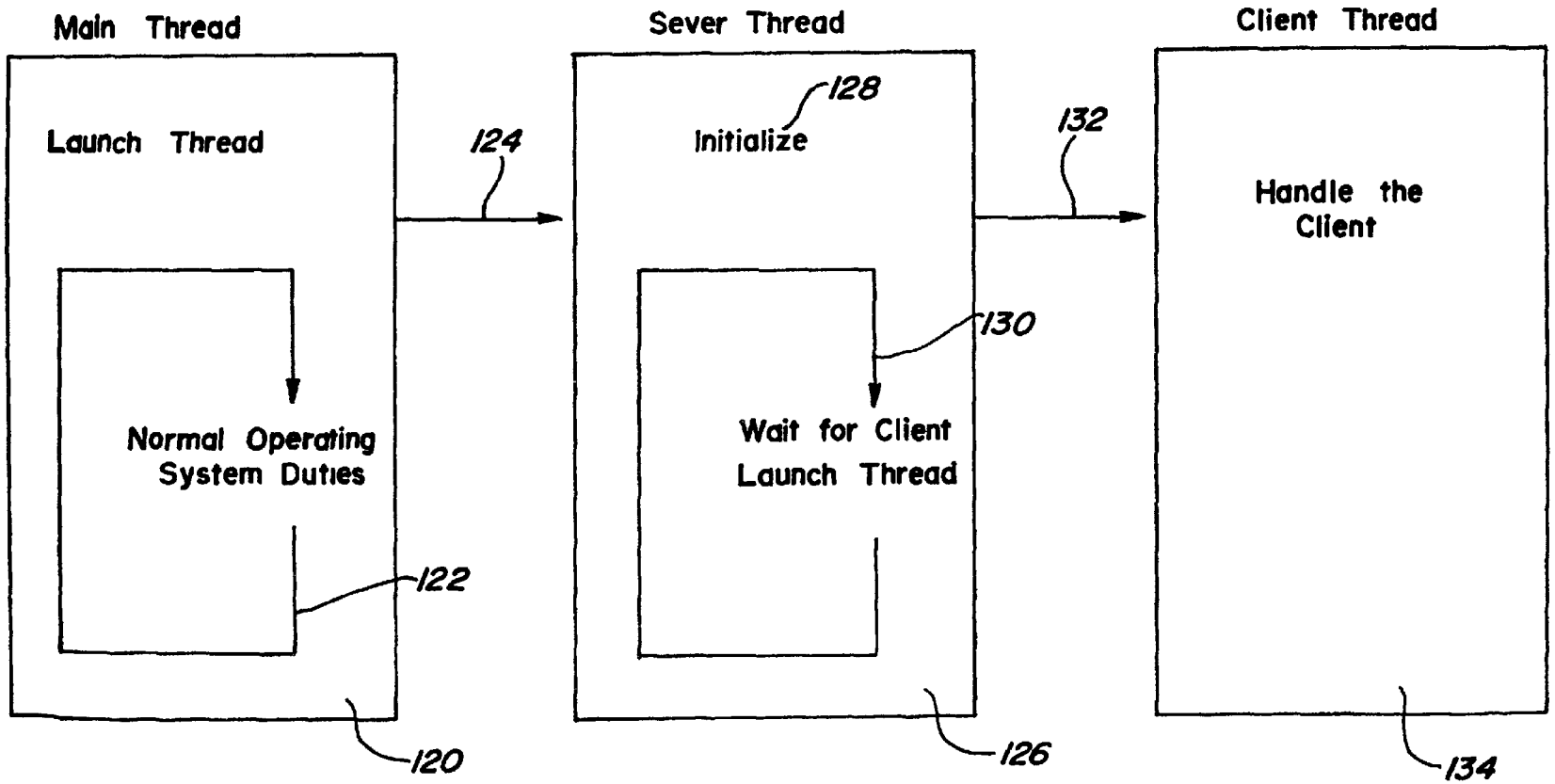
FIG. 5 is a block diagram illustrating the presently preferred mechanism for implementing the client/server architecture, illustrating how multiple threads operate in the presently preferred embodiment.

As stated above, the presently preferred embodiment uses a multitasking operating system which supports the processing of multiple processes or multiple threads effectively simultaneously. This allows client applications and server applications to operate effectively concurrently. To illustrate how multiple threads operate in the presently preferred embodiment refer to FIG. 5. In FIG. 5, the left-most box designated main thread 120 represents the starting point. Main thread 120 is launched by the operating system. One of the functions of main thread 120 is to perform or control the performance of the operating system routines illustrated in FIG. 5 by loop 122. When a server is started under the operating system the main thread launches a server thread, as represented by launch thread arrow 124. The server thread is represented by box 126. In the preferred embodiment the server thread performs the necessary initialization routines 128 and then enters a loop or state 130 where it waits for a client to initiate a connection request. When such a request is received the server thread launches a client thread, depicted in FIG. 5 by launch thread arrow 132. The client thread is depicted by block 134 in FIG. 5. It is responsible for handling the client's request. Once the client thread is launched by the server thread, the server thread returns to its wait for client loop or state 130, whereby the server thread is then able to launch additional client threads upon demand. Thus in the preferred embodiment, each server that is running will include a main thread and a server thread. Client threads are generated on an as needed basis. There is one client thread for each currently connected client.

Communication between client and server, whereby requests are passed to the server and responses passed back to the clients, may be accomplished in a variety of different ways. In general, the methods of communicating between multiple processes running on the same CPU include shared memory, semaphores, pipes, queues and signals. The methods of communicating between multiple processes running on different CPUs (distributed architecture) include mechanisms such as NETBIOS, named pipes, sockets and mail slots. Collectively all of these methods of communicating between multiple processes form part of the interprocess communication (IPC) mechanism. Not all multitasking operating systems provide each of the IPC mechanisms. The presently preferred embodiment runs under the OS/2 operating system and uses LAN Server to provide operating system support for a distributed application architecture over a network. The presently preferred embodiment uses named pipes as the IPC mechanism.

Named pipes allow one process to communicate with another process as follows. The client process first requests a named pipe connection to a server process. Once this connection is made, there is little distinction between the client process and the server process, since either can communicate with the other. One advantage of using the named pipe IPC mechanism is that the client process machine does not have to be running under the same operating system as the server process. All that is required is that the operating system platform on which the client process is running will support named pipes. Thus, a client process running under MS-DOS, or under MS-DOS with windows, for example, could establish communication with a server process running under the presently preferred OS/2 system, provided named pipe communication is supported. Essentially, under a named pipe communications scheme, the server process is known by a pipe name. Programs wishing to connect to that server will use the pipe name, in a fashion similar to using a file name. For example, pipe names may take the form:

\PIPE\pipename; or
\\server\PIPE\pipename.

Figure 6:
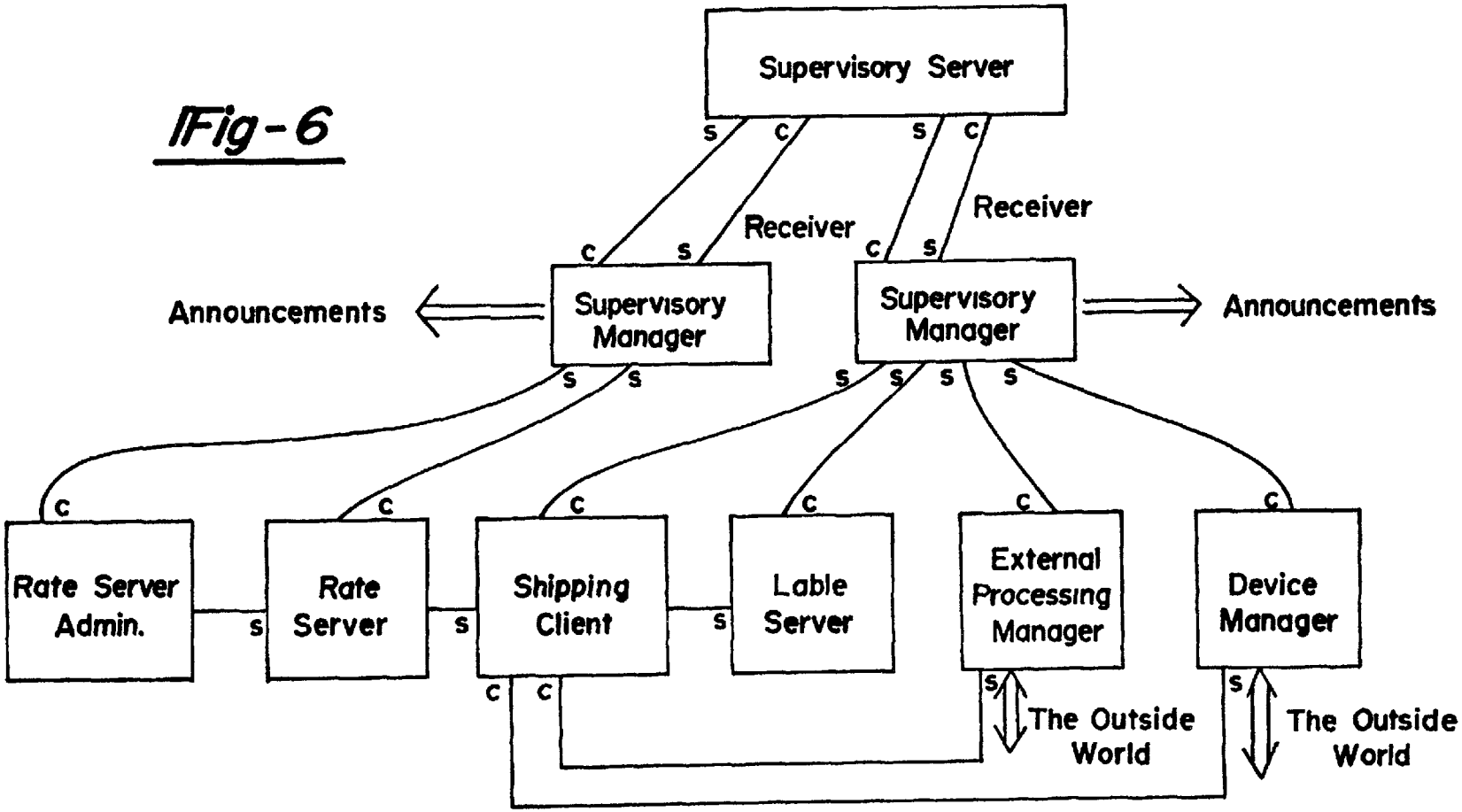
FIG. 6 is a block diagram illustrating the present preferred tree-structured client/server communications mechanism.

Although the named pipe IPC mechanism permits communication between any server and any client, the presently preferred configuration constrains communication to a tree-structured communications scheme illustrated in FIG. 6. Referring to FIG. 6, the single supervisory server communicates directly with only supervisory managers. In FIG. 6 the lines of communication are designated by the letter "C" at one end and the letter "S" at the other end. These indicate, for a given line of communication, which object is the client and which object is the server. Thus each of the supervisory managers communicates as the client with the supervisory server. In a similar fashion, the rate server, label server, external processing manager and device manager all communicate as clients with the supervisory managers, as servers. Likewise, the rate server administration object, the shipping circuit and the device manager administration object all communicate as clients with one or more of the objects appearing above them in FIG. 6 (namely rate server, label server, external processing manager and device manager). Thus it will be seen that certain objects function in a dual capacity, serving as client objects in some instances and serving as server objects in other instances.

The presently preferred communications scheme permits objects to communicate with devices, external databases and other computer systems which are not part of the client/server logistics management system. To accommodate this certain objects are given the ability to communicate with the outside world. These objects include the device manager, which communicates with hardware devices, such as printers, bar code scanners, modems, postal scales and the like. Communication with external databases and other programs which do not form a part of the client/server logistics management system (e.g., accounting software packages, spreadsheet programs, operating system utilities and the like) are communicated with through the external processing manager.

Because the presently preferred embodiment can be implemetned in multiple CPU environments (distributed architecture), an announcement mechanism is provided in order to extend the communications scheme to multiple CPUs across a network. The supervisory managers are preprogrammed with the ability to send "announcements" across the network operating system according to the named pipe protocol which has been implemented. Thus, as illustrated in FIG. 6, each of the supervisory managers includes a communications pathway designated "announcements" through which communications with parts of the system operated by different CPUs are sent and received. The supervisory managers are not, themselves, responsible for coordinating this message passing between objects controlled by different CPUs. That function is reserved for the supervisory server, since the supervisory server occupies the unique position of controlling the registration process whereby client and server applications are made aware of each other in order to communicate. However, in order to distribute the announcement function, the supervisory managers are responsible for providing the actual announcement communications. In this regard, the supervisory managers act as servers, with the supervisory server in this instance, acting as the client. To illustrate this in FIG. 6, each of the supervisory managers is connected to the supervisory server by a second line of communication designed "receiver." It will be understood that these "receiver" connections represent a "reverse" client/server connection, in which the supervisory server acts as a client in order to request announcement services from the supervisory managers, acting as announcement servers.

In summary, FIG. 6 illustrates the preferred IPC connections over which client/server communications take place. The presently preferred embodiment uses a tokenized message passing scheme in which all data is passed back and forth between client and server as ordered pairs of tokens and associated data values. The purpose of the token is to uniquely identify the data associated with it. Referring to Table II in the accompanying Appendix, a sample listing of tokens is presented. Reading the columns of Table II from left to right, the left-most column lists the token name; the column to its immediate right gives a brief description of the nature of the value associated with the token; the next right-most column lists the type declaration of the value; and the right-most column gives the maximum length of the value, where applicable.

The tokenized message handling scheme is very flexible, in that new tokens can be added at any time to accommodate new features, without the need to rewrite all client and server data structures. This is in contrast to the conventional fixed field data structure used in conventional data communication schemes. In the conventional, fixed field data structure scheme adding a new data value often requires all program modules to be rewritten to accommodate the added data field. The tokenized message passing scheme of the present invention avoids this problem. If a new data field is required, to support a new feature, for example, a new token is created and only those objects which make use of the new value will need to be reprogrammed to scan for the newly added token. All remaining objects simply ignore tokens which are undefined for them.

The presently preferred tokenized message passing scheme implements automatic data type conversion. As set forth in Table II, the type definitions of all values associated with tokens are predefined, thus the tokenized message passing scheme has advance knowledge of the data types of all values. This allows the tokenized message handling scheme to perform all data type conversions, removing the need for client and server objects to perform type conversions. In other words, a server can pass a long word value to a client which is expecting a string value. The tokenized message handling scheme performs the data conversion automatically so that the server does not need to be aware of the client's data type requirements and the client does not need to be aware of the server's data type requirements.

External Processing Manager

In order to allow the client server logistics management system to communicate with the outside world, e.g. with external data bases or other application programs, the external processing manager is provided. The external processing manager is, itself, a client of a supervisory manager, as illustrated in FIG. 6. The external processing manager, in turn, operates as a server to provide external processing functions to other clients. In FIG. 6 the shipping client uses the external processing manager for this purpose.

In the preferred embodiment, the external processing manager interfaces with the REXX command interpreter supplied with the OS/2 operating system. The external processing manager is designed to receive its instructions from an ASCII file called a script file. If desired the script file can be encrypted to prevent unauthorized access. The script file comprises a list of program commands or instructions written in the REXX language. If desired, the REXX language command set can be extended to add additional commands. This may be done by embedding the additional commands in the external processing manager. The external processing manager would envoke the REXX interpreter and register itself as the source of the additional commands. In this way, the REXX interpreter would automatically pass control to the external processing manager to handle the additional commands. The external processing manager is designed to communicate directly with the REXX interpreter, passing the script file commands to the REXX interpreter and requesting the output of the REXX interpreter to be directed back to the external processing manager, where appropriate. In this way, the external processing manager is given access to the operating system and to all other application programs running on the operating system. This is a very powerful command which allows the logistics management system to interface with other applications which may not necessarily be designed to integrate directly with the logistics management system. For example, the external processing manager could use the REXX interpreter to send SQL queries to a database, in order to upload information about a customer's account from the accounting system software.

The external processing manager's ability to handle scripts provides another powerful feature. Scripts may be written for the purpose of modifying the performance of other program objects comprising the logistics management system. Scripts can be used, for example, change the shipments client to provide a reminder message to the user in the event the user attempts to ship a package without first entering the weight of the package. Similarly, a script could be written to change the shipments client to supply a convenient list of package dimension sizes, allowing the operator to quickly fill in the size of a package in the appropriate field by simply selecting it from a list. In general, the scripting language can be used to provide virtually any custom tailoring that a shipper might want to implement. The REXX language is straightforward and easy to use, thus most customizing to meet the user's requirements can be done in the field, without the need to access or modify the underlying program source code.

In running a script to modify the performance of a program object, the external processing manager uses the existing IPC mechanism. Through this mechanism the external processing manager can request a data item stored by the object or it may supply a data value as an input to the data object. In addition, the external processing manager can request that one or more operations defined for that object to be performed. Thus the external processing manager serves as an alternate to the normal user interface as a means for manipulating data or performing operations.

From the foregoing it will be seen that the present invention provides a logistics management system comprising a plurality of building blocks or client/server objects. These objects can be configured to communicate in a variety of different ways to accommodate virtually any transportation-related logistics application. Thanks to the client/server architecture and the support for distributed architectures, the overall logistics management task is readily subdivided into highly self contained functional units. When changes in a given function are required, only the object providing the function normally needs to be changed. The client/server objects provide further flexibility through the external processing manager and scripting language, whereby individual objects can be modified to provide special features quite readily on an as needed basis.

While the invention has been described in its presently preferred form, it will be understood that the principles of the invention may be extended to a wide variety of different forms. Accordingly, the preferred embodiment described herein should be considered as exemplary of the principles of the invention and not as a limitation of the scope of the claims.

TABLE II

APPENDIX

| I/O TOKEN | VALUE DESCRIPTION | TYPE DESCRIPTION | MAXIMUM LENGTH |
|---|---|---|---|
| | Registry | | |
| To register a program: | | | |
| REGISTER | PROG_ID_ . . . id from | string | |
| PROGRAM | PROGISTI.H machine on | | |
| ID | which program is running | | |
| MACHINE | blank if no network use | | |
| | getmachinename( ) function | | |

TABLE II-continued

APPENDIX

| I/O TOKEN | VALUE DESCRIPTION | TYPE DESCRIPTION | MAXIMUM LENGTH |
|---|---|---|---|
| To unregister a program: | | | |
| UNREGISTER | PROG__ID__ . . . id from | string | |
| PROGRAM | PROGISTI.H machine on | | |
| ID | which program is running | | |
| MACHINE | blank if no network use | | |
| | getmachinename( ) function | | |
| Use this to get a list of ALL programs running in the environment. If FILENAME is blank, then either the program is not a server or it is a server you cannot use. For historical purposes, you may use ENUM SERVER as well as ENUM PROGRAM. | | | |
| ENUM | your current/local machine | string | |
| PROGRAM | blank if no network use | | |
| MACHINE | getmachinename( ) function | | |
| [ | PROG__ID__ . . . id from | string | 150 |
| ID | PROGISTI.H user-friendly | | |
| NAME | name of the program for | | |
| | DISPLAY PURPOSES ONLY!! | | |
| TYPE | "server type" mask from | ushort | |
| MACHINE | PROGISTI.H machine on | string | |
| | which program is running FOR | | |
| | DISPLAY PURPOSES ONLY!! | | |
| ZONE | where is the program running? | short | |
| | 1 = on your local machine | | |
| | 2 = somewhere else | | |
| FILENAME | pipe name you may use to | string | |
| | access server - BLANK IF | | |
| | YOU CANNOT ACCESS | | |
| | SERVER | | |
| . . . ] | | | |
| Announcements | | | |
| Use this to send an announcement. Only include the DATA token if you need it (it uses a queue slot on the receiving machines). You may include one or more specific machine names if you want the announcement sent to specific machines. If you don't specify MACHINE or if it is blank, the announcement will be sent to all machines currently in the environment. | | | |
| ANNOUNCE | ANN__ . . . from ANNOUNCE.H | long string | ANNOUN |
| ID | optional string | CE__DATA | |
| [DATA | | | LEN] |
| [ | | | |
| [MACHINE | destination machine name | string] | |
| . . . ] | | | |
| Miscellaneous | | | |
| Use this to close the environment. This is harmless and will not close anything that is not ready to be closed. It will never shut down a machine. | | | |
| SHUTDOWN | | | |
| System Numbers | | | |
| If QUERY/ENUM/MODIFY SYSNBR is used with an SYSNBR ID that does not yet exist, an entry is automatically added to the number list with these defaults: | | | |
| Last value used | (VALUE) | 0 | |
| First in sequence | (START) | I | |
| Limit/last in sequence | (STOP) | 2147483646 | (maximum long) |
| In all cases, the value passed for TOK-SYSNBR must be non-zero (except for ENUM) and unique within all programs that might ever be running in the system. The recommendation is to use the appropriate TOK__ . . . define for your SYSNBR value. | | | |
| To got the next number in sequence: | | | |
| QUERY | see rules above | short | |
| SYSNBR | | | |
| VALUE | next number in sequence | long | |
| To get the status of an entry in the number list: | | | |
| ENUM | see rules above | short | |
| SYSNBR | | | |
| ID | | short | |
| VALUE | see doc above | long | |
| START | see doc above | long | |
| STOP | see doc above | long | |
| INCREMENT | see doc above | long | |

TABLE II-continued

APPENDIX

| I/O TOKEN | VALUE DESCRIPTION | TYPE DESCRIPTION | MAXIMUM LENGTH |
|---|---|---|---|
| To get the status of all entries in the number list: | | | |
| ENUM | | | |
| SYSNBR | (no value specified) | | |
| [ | | | |
| ID | | short | |
| VALUE | see doc above | long | |
| START | see doc above | long | |
| STOP | see doc above | long | |
| INCREMENT | see doc above | long | |
| . . . ] | | | |
| To change the status of an entry in the number list: | | | |
| MODIFY | | | |
| SYSNBR | see rules above | short | |
| VALUE | see doc above - optional | long | |
| START | see doc above - optional | long | |
| STOP | see doc above - optional | long | |
| INCREMENT | see doc above - optional | long | |
| If any optional token is not specified, the previous value is not changed. This can be used to change certain numbers without being required to change others. For example, if you add to entry and want to use the defaults for START, STOP and INCREMENT but want specify you own VALUE, you can do it. | | | |
| Shipper Maintenance | | | |
| All of these commands deal with the master list of shippers. Clients can access the master list via ENUM. An announcement is sent when any shipper information of any kind changes. This allows other programs to know when they need to do another ENUM - especially if they are storing additional shipper information in parallel with this master list. Other programs can use LOCK and UNLOCK to prevent a shipper from being deleted "out from under, them". | | | |
| To get full information on all current shippers: | | | |
| ENUM | | | |
| SHIPPER | | | |
| [ | Unique ID for this shipper | string | SHPAB- |
| ID | unique shipper short name | | BRLEN |
| SYMBOL | follows C rules for a variable | | |
| NAME | user-friendly shipper name FOR DISPLAY PURPOSES ONLY!! | string | undefined |
| ERRCODE | validity/status of shipper | string | SHPAB- |
| SHPNA | name/address | boolean | BRLEN |
| SHPABBR | shipper abbreviation | | |
| LOCK | is shipper locked by some program? | | |
| . . . ] | | | |
| To get full information on a shipper: | | | |
| ENUM | | | |
| SHIPPER | shipper ID (from ENUM SHIPPER) | | |
| ID | unique ID for this shipper | string | SHPAB- |
| SYMBOL | unique shipper short name | | BRLEN |
| NAME | follows C rules for a variable user-friendly shipper name FOR DISPLAY PURPOSES ONLY!! | string | undefined |
| ERRCODE | validity/status of shipper | string | SHPAB- |
| SHPNA | name/address | boolean | BRLEN |
| SHPABBR | shipper abbreviation | | |
| LOCK | is shipper locked by some program? | | |
| To change a shipper's information: | | | |
| MODIFY | shipper ID (from ENU | string | SHPAB- |
| SHIPPER | SHIPPER) | | BRLEN |
| SHPNA | name/address - optional | | |
| SHPABBR | shipper abbreviation - optional string | | |
| To add a shipper: | | | |
| ADD | | | |
| SHIPPER | | | |
| To delete a shipper: | | | |
| DELETE | shipper ID (from ENUM | | |
| SHIPPER | SHIPPER) | | |
| To check-out a shipper to a program to prevent deleting: | | | |
| LOCK | shipper ID (from ENUM | | |

TABLE II-continued

APPENDIX

| I/O TOKEN | VALUE DESCRIPTION | TYPE DESCRIPTION | MAXIMUM LENGTH |
|---|---|---|---|
| SHIPPER | SHIPPER) | | |
| PROGRAM | PROG__ID__ . . . ID from PROGISTI.H | | |
| MACHINE | machine on which program is running string blank if no network use getmachinename( ) function | | |
| To check-in a shipper (UNLOCK): | | | |
| UNLOCK | shipper ID (from ENUM | | |
| SHIPPER | SHIPPER) | | |
| PROGRAM | PROG__ID__ . . . ID from PROGISTI.H | | |
| MACHINE | machine on which program is running string blank if no network use getmachinename( ) function | | |
| | Commitment Code | | |
| To get the master list of available commitments: | | | |
| ENUM COMMIT-MENT | | | |
| [ | COMMIT__ . . . ID from RATER.H | string | undefined |
| ID | Commitment short name | | |
| SYMBOL | follows C rules for a variable | | |
| NAME | user-friendly commitment name FOR DISPLAY PURPOSES ONLY!! | string | undefined |
| . . . ] | | | |
| START | use manifest mode? | boolean] | |
| [MANIFEST | /* default package info */ | | |
| [ | | | |
| SHIPDATE | date (TDC) | long 0 | |
| SHIPPER | ID | short 0 | |
| DONTBAND | don't band yet | boolean | |
| SERVICE | ID (see FDXRATER.H) | short 0 | |
| PKGTYPE | ID (see RATER.H) | short 0 | |
| PAYTYPE | payment type (see RATER.H) | short 0 | |
| PAYORACCT | payor account number | string | LFDX__-PAYOR |
| WEIGHT | Weight | long 3 | |
| REF | reference | string | LEN__RE-FER-ENCE |
| LENGTH | package length | short 0 | |
| WIDTH | package width | short 0 | |
| HEIGHT | package height | short 0 | |
| RCPID | recipient ID | string | LEN__RE-CIPIENT-ID |
| RCP-CONTACT | recipient contact name | string | NALEN__-CON-TACT |
| RCP-COMPANY | recipient company name | string | NALEN__-COM-PANY |
| RCPADDR1 | recipient address line 1 | string | NALEN__-ADDR |
| RCPADDR2 | recipient address line 2 | string | NALEN__-ADDR |
| RCPCITY | recipient city | string | NALEN__-CITY |
| RCPSTATE | recipient state | string | NALEN__-STATE |
| DEST | postal code | string | NALEN__-ZIP |
| RCPPHONE | recipient phone number | string | MAX-PHONE-LEN |
| CODAMOUNT | COD amount | long 2 | |
| CODTYPE | logical OR of COD__ . . . | short | |
| HAZ | hazardous materials? | boolean | |
| SIGREL | signature release? | boolean | |
| DIRECTDEL | direct delivery (Dingle)? | boolean | |
| HOLD | hold for delivery? | boolean | |

TABLE II-continued

APPENDIX

| I/O TOKEN | VALUE DESCRIPTION | TYPE DESCRIPTION | MAXIMUM LENGTH |
|---|---|---|---|
| SATDEL | Saturday delivery? | boolean | |
| DECVAL | declared value | long 0 | |
| ICE | weight of dry ice (whole lbs) | short 0 | |
| ] | | | |
| LISTID | next package list ID | long 0 | |
| ITEM | | | |
| LISTID | id | long 0 | |
| [ | | | |
| SHIPDATE | date (TDC) | long 0 | |
| SHIPPER | ID | short 0 | |
| DONTBAND | don't band yet | boolean | |
| SERVICE | ID (see FDXRATER.H) | short 0 | |
| PKGTYPE | ID (see RATER.H) | short 0 | |
| PANTYPE | payment type (see RATER.H) | short 0 | |
| PAYORACCT | payor account number | string | LFDX_-PAYOR |
| WEIGHT | Weight | long 3 | |
| REF | reference | string | LEN_RE-FER-ENCE |
| LENGTH | package length | short 0 | |
| WIDTH | package width | short 0 | |
| HEIGHT | package height | short 0 | |
| RCPID | recipient ID | string | LEN_RE-CIPIENT-ID |
| RCP-CONTACT | recipient contact name | string | NALEN_-CON-TACT |
| RCP-COMPANY | recipient company name | string | NALEN_-COM-PANY |
| RCPADDR1 | recipient address line 1 | string | NALEN_-ADDR |
| RCPADDR2 | recipient address line 2 | string | NALEN_-ADDR |
| RCPCITY | recipient city | string | NALEN_-CITY |
| RCPSTATE | recipient state | string | NALEN_-STATE |
| DEST | postal code | string | NALEN_-ZIP |
| RCPPHONE | recipient phone number | string | MAX-PHONE-LEN |
| CODAMOUNT | COD amount | long 2 | |
| CODTYPE | logical OR of COD_ . . . | short | |
| HAZ | hazardous materials? | boolean | |
| SIGREL | signature release? | boolean | |
| DIRECTDEL | direct delivery (Dingle)? | boolean | |
| HOLD | hold for delivery? | boolean | |
| SATDEL | Saturday delivery? | boolean | |
| DECVAL | declared value | long 0 | |
| ICE | weight of dry ice (whole lbs) | short 0 | |
| ] | | | |
| MSN | ID | long 0 | |
| RTCODE | routing code | string | 9 |
| COMMIT-MENT | code (see RATER.H) | short 0 | |
| ARRIVE | date (TDC) | long 0 | |
| DIMWT | dimensional weight | short 0 | |
| [TRACKNBR | tracking number/COD tracking # | string | 11] |
| CODRETTRK | COD return tracking number | string | 11] |
| CONTENTS | /* ignored for now */ | | |
| RATE | | | |
| LISTID | ID | long 0 | |
| standard | see SERVER.DOC | | |
| COD | COD charge | long 2 | |
| DECVAL | declared value charge | long 2 | |
| HAZ | dangerous goods charge | long 2 | |
| SATDEL | saturday delivery charge | long 2 | |
| SATPU | saturday pickup charge | long 2 | |
| ALASKACHG | Alaska delivery charge | long 2 | |

TABLE II-continued

APPENDIX

| I/O TOKEN | VALUE DESCRIPTION | TYPE DESCRIPTION | MAXIMUM LENGTH |
|---|---|---|---|
| HAWAIICHG | Hawaii delivery charge | long 2 | |
| DIMRATE | any package DIM rated? | boolean | |
| END | | | |
| LISTID | ID | long 0 | |
| [DELETE | true to just throw list away | boolean] | |
| [ | /* if manifest*/ | | |
| standard | see SERVER.DOC | | |
| ] | | | |
| VOID returns a list of other MSNs whose data was changed. Package documentation should be reprinted and any data saved should be QUERYed again: | | | |
| VOID | | | |
| ID | MSN | long 0 | |
| [ | | | |
| MSN | list of MSNs | long 0 | |
| . . . ] | | | |
| LIST | | | |
| BAND | | | |
| SHIPPER | ID | short 0 | |
| [ | | | 18 |
| NAME | displayable form of shipdate | string | |
| ID | thing to pass to band | long 0 | |
| . . . ] | | | |
| LIST | | | |
| DEL | | | |
| [TRANSMIT] | | | |
| SHIPPER | ID | short 0 | |
| [ | | | |
| NAME | displayable shipdate & | string | 21+ |
| ID | seqnum filename | string | 12 |
| . . . ] | | | |
| LIST | | | |
| TRANSMIT | | | |
| SHIPPER | ID | short 0 | |
| [ | | | |
| NAME | shipdate & seqnum | string | 21+ |
| ID | filename | string | 12 |
| . . . ] | | | |
| (see PRINT section - SERVER.DOC) | | | |
| LIST | | | |
| PRINT | | | |
| . . . | | | |
| . . . | | | |
| BAND | | | |
| SHIPPER | ID | short 0 | |
| ID | thing returned from LIST | long 0 | |
| ID | filename created | string | 12 |
| DEL | | | |
| [TRANSMIT] | | | |
| [ | | | |
| ID | filename (returned from LIST) | string | 12 |
| . . . ] | | | |
| (see PRINT section - SERVER.DOC) | | | |
| PRINT | | | |
| . . . | /* courier & summary report */ | | |
| ID | filename (returned from LIST) | string | 12 |
| | /* ASTRA label */ | | |
| MSN | package master sequence number | long 0 | |
| [PRINT-ERROR | ignore print error? | boolean] | |
| | /* rate chart */ | | |
| SHIPPER | ID | short 0 | |
| | /* airbill */ | | |
| MSN | package master sequence number | long 0 | |
| . . . | | | |
| [MORE | true | boolean] | |
| QUERY | | | |
| PRINT | | | |
| (see PRINT section - SERVER.DOC) | | | |
| . . . | | | |
| . . . | | | |

TABLE II-continued

APPENDIX

| I/O TOKEN | VALUE DESCRIPTION | TYPE DESCRIPTION | MAXIMUM LENGTH |
|---|---|---|---|
| QUERY | | | |
| ITEM | | | |
| Standard stuff | | | |
| (see (ENUM section - SERVER.DOC) | | | |
| ENUM | | | |
| SHIPPER | | | |
| [ | | | |
| SYSNBR | POWERSHIP plus number | string | |
| ACCOUNT | FedEx account number | string | |
| USER | IIN user Id | string | |
| PWD | IIN password | string | |
| PWD | IE password | string | |
| USER | recipient user Id | string | |
| ORIGIN | origin station | string | |
| TRACKNBR | first tracking number | string | |
| TRACKNBR | last tracking number | string | |
| CODTRK | first COD tracking number | string | |
| CODTRK | last COD tracking number | string | |
| CODRETTRK | first COD return tracking number | string | |
| CODRETTRK | last COD return tracking number | string | |
| SIGREL | signature release authorization number | string | |
| PWRSHP | POWERSHIP plus complaint | boolean | |
| DIMRATE | use dimensional rating | boolean | |
| GNDSAVER | use Express saver | boolean | |
| . . . ] | | | |
| ENUM | | | |
| CONTROL | | | |
| SHIPPER | ID | | |
| TRACKNBR | last package tracking number used | string | |
| CODTRK | last COD tracking number used | string | |
| CODRETTRK | last COD return tracking number | string | |
| COUNT | cycle count | long 0 | |
| COUNT | transfer count | long 0 | |
| ENUM | | | |
| CONFIG | | | |
| DIAL | Hayes-compatible dialout command | string | LFDX_-DIAL |
| BAUD | baud rate | short | |
| PORT | port | short | |
| DIR | expedite directory | string | LFDX_-PATH |
| see FDXRATER.H for more information on each element | | | |
| MODIFY | | | |
| SHIPPER | ID | | |
| [see ENUM SHIPPER section] | | | |
| MODIFY | | | |
| CONTROL | | | |
| SHIPPER | ID | | |
| [see ENUM CONTROL section] | | | |
| MODIFY | | | |
| CONFIG | | | |
| [see ENUM CONTROL section] | | | |
| (after END with MANIFEST TRUE, use this to change item information) | | | |
| MODIFY | | | |
| ITEM | | | |
| MSN | package master sequence number | long 0 | |
| [DONTBAND don't band yet boolean] | | | |
| | /*see RATER.C */ | | |
| LOCK | | | |
| SHIPPER | ID | | |
| UNLOCK | | | |
| SHIPPER | ID | | |
| REFRESH | | | |
| SHIPPER | | | |
| LOAD | | | |
| ZONE | /*URSA routing file - - unZIPs!*/ | | |

TABLE II-continued

APPENDIX

| I/O TOKEN | VALUE DESCRIPTION | TYPE DESCRIPTION | MAXIMUM LENGTH |
|---|---|---|---|
| SHIPPER | ID | | |
| FILENAME | drive (A, B, etc.) | | |
| LOAD | | | |
| RATE | /* electronic rate file */ | | |
| SHIPPER | ID | | |
| FILENAME | drivepath and filename | | |
| LOAD | | | |
| REGION | /* region file, if Express saver */ | | |
| SHIPPER | ID | | |
| FILENAME | drivepath and filename | | |
| TRANSMIT | | | |
| SHIPPER | ID | | |
| [ | | | |
| ID | filename | | |
| . . . ] | | | |
| CANCEL | | | |

What is claimed is:

1. A logistics management tool to facilitate the process of shipping goods by a shipper via a selected one of a plurality of carriers, comprising:

a plurality of rate servers comprising computer-implemented rate storage and calculating means, at least one rate server for each of said plurality of carriers, at least one of said rate servers having message processing means for sending, receiving and handling messages;

at least one of said rate servers database means for maintaining a record of [the] rates applicable to a given one of said carriers and further having an embedded set of predefined methods representing [the] rate computation rules of said given one of said carriers;

at least one client application comprising computer-implemented input and output means separate from said rate servers and having *a* user interface to permit the shipper to [interact with said logistics management tool in order to] process [the] *a* shipment of goods;

at least one of said rate servers having a shipper interface means for defining a set of operations accessible to said client application; the set of operations representing [the] *a* procedure by which the shipper ships goods to thereby isolate the set of operations by which [a] *said* shipper ships from [the] rules by which [a] *said* carrier transports;

at least one supervisory server for integrating operations of said *at least one* rate server, and for making said operations accessible to said client application, said supervisory server having message processing means for sending messages to and receiving messages from said *at least one* rate server and said client application and for handling messages sent and received based upon a predefined set of rules.

2. The tool of claim 1 further comprising *a* scripting system communicating with said client application for modifying at least one of said set of operations representing the procedure by which the shipper ships goods.

3. The tool of claim 1 wherein said client application comprises a shipments client for rating and documenting a group of packages comprising a shipment being processed by the shipper.

4. The tool of claim 1 wherein said client application comprises a packages client for rating and documenting a single piece of shipment being processed by the shipper.

5. The tool of claim 2 wherein said scripting system is a script administration client comprising [one of] said client application[s].

6. The tool of claim 1 wherein said client application comprises a carrier rate adjustments client having a user interface operable to allow [the] *a* user to alter the predefined methods representing the rate computation rules.

7. The tool of claim 1 further comprising *a* document server for providing printing services to said client application.

8. The tool of claim 7 wherein said printing services include printing documents generated to effect shipment.

9. The tool of claim 1 wherein said rate server is installed on a first computer system and wherein said client application is installed on a second computer system, the first and second computer systems being coupled together over a network.

10. The tool of claim 1 further comprising *an* external processing manager for providing communications services to permit said client application to request and receive data from an external database not supervised by said supervisory server.

11. The tool of claim 10 [wherein said logistics management tool is installed under], *further comprising* an operating system which provides *a* command interpreter facility and wherein said external processing manager interfaces with said operating system to use said command interpreter facility to provide said communications services.

12. The tool of claim 11 wherein said command interpreter facility is responsive to a predefined command set and wherein said external processing manager includes means integrated with said command interpreter facility for supplementing said predefined command set.

*13. A logistics management system to facilitate the process of shipping goods by a shipper via a carrier, comprising:*

*a rate server comprising computer-implemented rate storage and calculating means, said rate server having message processing means for sending, receiving and handling messages;*

*said rate server having database means for maintaining a record of rates applicable to said carrier and further having an embedded set of predefined methods representing rate computation rules of said carrier;*

*at least one client application comprising computer-implemented input and output means separate from said rate server and having a user interface to permit the shipper to process shipments of goods;*

*said rate server having a shipper interface means for defining a set of operations accessible to said client application; the set of operations representing a procedure by which the shipper ships goods to thereby isolate the set of operations by which said shipper ships from rules by which said carrier transports;*

*at least one supervisory server for integrating operations of said rate server, and for making said operations accessible to said client application, said supervisory server having message processing means for sending messages to and receiving messages from said rate server and said client application and for handling messages sent and received based upon a predefined set of rules.*

*14. The system of claim 13 further comprising a scripting system communicating with said client application for modifying at least one of said set of operations representing the procedure by which the shipper ships goods.*

*15. The system of claim 13 wherein said client application comprises a shipments client for rating and documenting a group of packages comprising a shipment being processed by the shipper.*

*16. The system of claim 13 wherein said client application comprises a packages client for rating and documenting a single piece of shipment being processed by the shipper.*

*17. The system of claim 14 wherein said scripting system is a script administration client comprising said client application.*

*18. The system of claim 13 wherein said client application comprises a carrier rate adjustments client having a user interface operable to allow a user to alter the predefined methods representing the rate computation rules.*

*19. The system of claim 13 further comprising a document server for providing printing services to said client application.*

*20. The system of claim 19 wherein said printing services includes printing documents generated to effect shipment.*

*21. The system of claim 13 wherein said rate server is installed on a first computer system and wherein said client application is installed on a second computer system, the first and second computer systems being coupled together over a network.*

*22. The system of claim 13 further comprising an external processing manager for providing communications services to permit said client application to request and receive data from an external database not supervised by said supervisory server.*

*23. The system of claim 22, further comprising an operating system which provides a command interpreter facility and wherein said external processing manager interfaces with said operating system to use said command interpreter facility to provide said communications services.*

*24. The system of claim 23 wherein said command interpreter facility is responsive to a predefined command set and wherein said external processing manager includes means integrated with said command interpreter facility for supplementing said predefined command set.*

*25. The system of claim 13 wherein said rate server is installed on a first computer system and wherein said client application is installed on a second computer system, the first and second computer systems communicating over a global-wide area network.*

*26. The system of claim 13, wherein the supervisory server comprises an interprocess communication mechanism for passing messages between the rate server and the client application.*

*27. A logistics management system to facilitate the process of shipping goods by a shipper via a carrier, comprising:*

*a rate server, connected to a network, having a set of rules by which said carrier transports;*

*a client application, connected to the network, having a set of rules by which said shipper ships; and*

*a supervisory server, connected to the network, through which said rate server and said client application register to establish a mutual message communication capability by which said rate server and said client application thereafter pass messages independently of said supervisory server over an interface between them, said interface isolating the set of rules by which the shipper ships from the rules by which the carrier transports.*

*28. The system of claim 27, wherein:*

*the client application includes a client interface for communicating with the client application; and*

*the rate server is configured to communicate with the client application via the client interface.*

*29. The system of claim 27, wherein the messages comprise:*

*at least one predefined request message issued by the client application to the rate server; and*

*at least one predefined response message issued by the rate server to the client application.*

*30. The system of claim 29, wherein:*

*the predefined request message includes a weight and a delivery date for a package to be shipped; and*

*the predefined response message includes a cost for shipping the package.*

*31. The system of claim 27, wherein the set of rules by which the carrier transports comprises a knowledge base of rate structures and carrier practices pertaining to the carrier.*

*32. The system of claim 27, wherein the set of rules by which the shipper ships comprises a knowledge base of shipper's rules, regulations and practices pertaining to the shipper.*

*33. The system of claim 32, wherein the knowledge base of the shipper's rules, regulations, and practices comprises rules for taking orders for goods from customers, packaging the goods, and shipping the goods to customers.*

*34. The system of claim 27, wherein the client application further comprises a user interface for collecting input information from a user about a desired shipping operation and for providing output information.*

*35. The system of claim 27, wherein the supervisory server engages an interprocess communication mechanism to facilitate message passage between the rate server and the client application.*

*36. The system of claim 35, wherein the interprocess communication mechanism is selected from the group consisting of shared memory, semaphores, named pipes, queues, signals, netbios, sockets, and mail slots.*

*37. The system of claim 35, further comprising an external processing manager for interfacing with external data bases or other application programs.*

*38. The system of claim 35, further comprising a device manager for interfacing with external peripheral devices.*

*39. The system of claim 35, wherein the client application further comprises a document server for printing of a shipping document.*

*40. The system of claim 35, further comprising a document administration object for extending communication standards for the interprocess communication mechanism.*

*41. The system of claim 27 wherein the rate server is installed on a first computer system and wherein the client application is installed on a second computer system, the first and second computer systems communicating over a global-wide area network.*

*42. The system of claim 27, wherein the messages comprise:*

*at least one predefined response message that includes a cost for shipping one or more packages issued by the rate server to the client application.*

*43. A logistics management system to facilitate the process of shipping goods by a shipper via a carrier, comprising:*

*a rate server having a record of one or more rates applicable to said carrier and further having an embedded set of predefined methods representing rate computation rules of said carrier, said rate server being connected to a network for sending, receiving and handling messages;*

*at least one client application connected to said network and is separately located from said rate server on said network, said client application having a user interface to permit the shipper to process shipments of goods;*

*said rate server having a shipper interface for defining a set of operations accessible to said client application, the set of operations representing a procedure by which the shipper ships goods to thereby isolate the set of operations by which said shipper ships from rules by which said carrier transports; and*

*at least one supervisory server for making said operations of said rate server accessible to said client application, said supervisory server being connected to said network for sending messages to and receiving messages from said rate server and said client application and for handling messages sent and received based upon a predefined set of rules.*

*44. The system of claim 43, wherein at least one predefined request message including a weight and a delivery date for a package to be shipped is issued by the client application to the rate server; and*

*at least one predefined response message including a cost for shipping the package is issued by the rate server to the client application.*

*45. The system of claim 43, wherein the rate server includes a knowledge base of rate structures and carrier practices pertaining to the carrier.*

*46. The system of claim 43, wherein the client application includes a knowledge base of the shipper's practices pertaining to the shipper.*

*47. The system of claim 46, wherein the knowledge base of the shipper's practices includes rules for taking orders for goods from customers, packaging the goods, and shipping the goods to customers.*

*48. The system of claim 43, wherein the supervisory server includes an interprocess communication mechanism for passing messages between the rate server and the client application.*

*49. The system of claim 43, wherein:*

*the client application includes a client interface for communicating with the client application; and*

*the rate server is configured to communicate with the client application via the client interface.*

*50. The system of claim 49, wherein the interprocess communication mechanism is selected from the group consisting of shared memory, semaphores, named pipes, queues, signals, netbios, sockets, and mail slots.*

*51. The system of claim 49 further comprising an external processing manager for interfacing with external data bases or other application programs.*

*52. The system of claim 49 further comprising a device manager for interfacing with external peripheral devices.*

*53. The system of claim 49, wherein the client application further includes a document server for printing a shipping document.*

*54. The system of claim 43 wherein said rate server is installed on a first computer system and wherein said client application is installed on a second computer system, the first and second computer systems communicating over a global-wide area network.*

*55. A logistics management method for facilitating the process of shipping goods by a shipper via a carrier, said shipper having a computer-implemented client application that has access to a network and which is related to shipping said goods, said client application having a set of rules by which the shipper ships, said method comprising the steps of:*

*providing a rate server having a set of rules by which the carrier transports in order to determine data related to shipping the goods;*

*providing access to said rate server on said network from the client application such that said rate server is separately located from said client application on said network; and*

*communicating the determined data from said rate server to said client application through an interprocess communication mechanism connected to said network and thereby isolating the set of rules by which the shipper ships from the rules by which the carrier transports.*

*56. The method of claim 55 further comprising the step of:*

*communicating the determined data to the client application through an accessible client interface.*

*57. The method of claim 55 further comprising the steps of:*

*issuing a request message by the client application to the rate server; and*

*issuing a response message by the rate server to the client application.*

*58. The method of claim 57, wherein:*

*the request message includes a weight and delivery date for a package to be shipped; and*

*the response message includes a cost for shipping the package.*

*59. The method of claim 55 further comprising the step of:*

*providing the rate server with a knowledge base of rate structures and carrier practices pertaining to the carrier.*

*60. The method of claim 55 further comprising the step of:*

*providing the client application with a knowledge base of the shipper's practices pertaining to the shipper.*

*61. The method of claim 60, wherein the knowledge base of the shipper's practices includes rules for taking orders for goods from customers, packaging the goods, and shipping the goods to customers' inputted destinations.*

*62. The method of claim 55 further comprising the step of:*

*collecting via a user interface input information from a user about a desired shipping operation.*

*63. The method of claim 55 further comprising the step of:*

*providing an interprocess communication mechanism for passing messages between the rate server and the client application.*

*64. The method of claim 63, wherein the interprocess communication mechanism is selected from the group consisting of shared memory, semaphores, named pipes, queues, signals, netbios, sockets, and mail slots.*

*65. The method of claim 63 further comprising the step of:*

*providing an external processing manager for interfacing with external data bases or other application programs.*

*66. The method of claim 63 further comprising the step of:*

*providing a device manager for interfacing with external peripheral devices.*

*67. The method of claim 63 further comprising the step of:*

*providing the client application with a document server for printing a shipping document.*

*68. The method of claim 55 further comprising the steps of:*

*installing the rate server on a first computer system, with the client application being a second computer system; and*

*providing the determined data of the rate server to the client application over a global-wide area network.*

*69. The logistics management method of claim 55, further comprising the step of providing at least one supervisory server configured to provide registration services to facilitate communication between the rate server and the client application.*

*70. The method of claim 55, further comprising the step of:*

*issuing a response message by the rate server to the client application, wherein the response message includes a cost for shipping one or more packages.*

*71. A logistics management system to facilitate the process of shipping goods by a shipper via a carrier, comprising:*

*a rate server, connected to a network, having a set of rules by which said carrier transports;*

*a client application, connected to the network, having a set of rules by which said shipper ships;*

*a supervisory server, connected to the network, with which said rate server and said client application register to facilitate communication of messages between said rate server and said client application independently of said supervisory server; and*

*an interface associated with at least one of said rate server and said client application which isolates the set of rules by which the shipper ships from the set of rules by which the carrier transports.*

*72. The system of claim 71, wherein:*

*the client application includes a client interface for communicating with the client application; and*

*the rate server is configured to communicate with the client application via the client interface.*

*73. The system of claim 71, wherein the messages comprise:*

*at least one predefined request message issued by the client application to the rate server; and*

*at least one predefined response message issued by the rate server to the client application.*

*74. The system of claim 73, wherein:*

*the at least one predefined request message includes a weight and a delivery date for a package to be shipped; and*

*the at least one predefined response message includes a cost for shipping the package.*

*75. The system of claim 71, wherein the set of rules by which the carrier transports comprises a knowledge base of rate structures and carrier practices pertaining to the carrier.*

*76. The system of claim 71, wherein the set of rules by which the shipper ships comprises a knowledge base of shipper's practices pertaining to the shipper.*

*77. The system of claim 76, wherein the knowledge base of the shipper's practices comprises rules for taking orders for good from customers, packaging the goods, and shipping the goods to customers.*

*78. The system of claim 71, wherein the client application further comprises a user interface for collecting input information from a user about a desired shipping operation and for providing output information.*

*79. The system of claim 71, wherein the supervisory server engages an interprocess communication mechanism to facilitate a message passage between the rate server and the client application.*

*80. The system of claim 79, wherein the interprocess communication mechanism is selected form the group consisting of shared memory, semaphores, named pipes, queues, signals, netbios, sockets, and mail slots.*

*81. The system of claim 79, further comprising an external processing manager for interfacing with external data bases or other application programs.*

*82. The system of claim 79, further comprising a device manager for interfacing with external peripheral devices.*

*83. The system of claim 79, wherein the client application further comprises a document server for printing a shipping document.*

*84. The system of claim 79, further comprising a document administration object for engaging communication standards for the interprocess communication mechanism.*

*85. The system of claim 71, wherein the rate server is installed on a first computer system and wherein the client application is installed on a second computer system, the first and second computer systems communicating over a global-wide area network.*

*86. A delivery management system, comprising:*

*at least one rate server having rate information based upon a set of rules by which a carrier delivers;*

*at least one client configured to collect input information from a user;*

*at least one supervisory server including at least one computer configured to provide registration services to facilitate communication between the rate server and the client via a client/server architecture utilizing an interprocess communication mechanism, said communication being independent of said supervisory server; and*

*whereby rules by which the user operates are isolated from the set of rules by which the carrier delivers.*

*87. The system of claim 86, wherein one or more computer processes are distributed across a network.*

*88. The system of claim 86, wherein at least two of the rate server, the client and the supervisory server run on a single processor.*

*89. The system of claim 86, wherein a first client, a first rate server, and a first supervisory server run on a single processor.*

*90. A logistics management system to facilitate the delivery of goods comprising:*

*a network architecture for passing messages;*

*a supervisory server having a registrar enabling communication with said network architecture;*

*at least one client application having a set of shipper rules and a first data processing service including a first registration service to register said client application with said registrar for establishing a line of communication*

*between said client application and said network architecture, a first interface service to collect input data, generate a request message based on said input data and said set of shipper rules and display a response message, and a first message handling service to communicate said request message and said response message between said client application and said network architecture; and*

*at least one rate server having a set of carrier rules and a second data processing service including a second registration service to register said rate server with said registrar for establishing a line of communication between said rate server and said network architecture, a second interface service to generate said response message based on said set of carrier rules and said request message, and a second message handling service to communicate said request message and said response message between said rate server and said network architecture;*

*wherein said first and second message handling services enable communication between said at least one client application and said at least one rate server via said network architecture and isolate said set of carrier rules from said set of shipper rules.*

*91. A computer-readable storage medium containing a set of computer-executable instructions for a method for facilitating the process of shipping goods by a shipper via a carrier, said shipper having a computer-implemented client application that has access to a network and which is related to shipping said goods, said client application having a set of rules by which the shipper ships, said set of instructions comprising:*

*providing a rate server having a set of rules by which the carrier transports in order to determine data related to shipping the goods;*

*providing access to said rate server on said network from the client application such that said rate server is separately located from said client application on said network; and*

*communicating the determined data from said rate server to said client application through an interprocess communication mechanism connected to said network and thereby isolating the set of rules by which the shipper ships from the rules by which the carrier transports.*

*92. A computer-controlled apparatus configured to perform a method for facilitating the process of shipping goods by a shipper via a carrier, said shipper having a computer-implemented client application that has access to a network and which is related to shipping said goods, said client application having a set of rules by which the shipper ships, said method comprising the steps of:*

*providing a rate server having a set of rules by which the carrier transports in order to determine data related to shipping the goods;*

*providing access to said rate server on said network from the client application such that said rate server is separately located from said client application on said network; and*

*communicating the determined data from said rate server to said client application through an interprocess communication mechanism connected to said network and thereby isolating the set of rules by which the shipper ships from the rules by which the carrier transports.*

* * * * *